US011403575B2

(12) United States Patent
Crow et al.

(10) Patent No.: US 11,403,575 B2
(45) Date of Patent: *Aug. 2, 2022

(54) VENDING MACHINE ROUTE MANAGEMENT

(71) Applicant: Vendwatch Telematics, LLC, Austin, TX (US)

(72) Inventors: James J. Crow, Austin, TX (US); Alfonso Javier Barragán Treviño, Monterrey (MX)

(73) Assignee: Vendwatch Telematics, LLC, Austin, TX (US)

( * ) Notice: Subject to any disclaimer, the term of this patent is extended or adjusted under 35 U.S.C. 154(b) by 119 days.

This patent is subject to a terminal disclaimer.

(21) Appl. No.: 16/750,685

(22) Filed: Jan. 23, 2020

(65) Prior Publication Data
US 2020/0184396 A1    Jun. 11, 2020

Related U.S. Application Data

(63) Continuation of application No. 15/474,481, filed on Mar. 30, 2017, now Pat. No. 10,552,776, which is a
(Continued)

(51) Int. Cl.
G06Q 10/06    (2012.01)
G06Q 20/20    (2012.01)
(Continued)

(52) U.S. Cl.
CPC ....... *G06Q 10/06315* (2013.01); *G06Q 20/18* (2013.01); *G06Q 20/203* (2013.01);
(Continued)

(58) Field of Classification Search
CPC .......... G06Q 10/06315; G06Q 20/203; G06Q 20/18; G06Q 20/4015; G06Q 20/308; G07F 9/001; G07F 9/002; G07F 9/026
See application file for complete search history.

(56) References Cited

U.S. PATENT DOCUMENTS 4,306,219 A * 12/1981 Main ................ G07F 5/18
340/870.07
5,608,643 A * 3/1997 Wichter .............. G07F 9/026
221/9
(Continued)

FOREIGN PATENT DOCUMENTS

CN        101479720 A  *  7/2009  .......... G06Q 10/047
KR    1020110121770      11/2011

OTHER PUBLICATIONS

Mustaffa, Noorfa Haszlinna. "Integrated Inventory and Transport Optimisation in Multi-Retailer Supply Chains." ProQuest Dissertations Publishing, 2009. Print. (Year: 2009).*
(Continued)

*Primary Examiner* — Ashford S Hayles
(74) *Attorney, Agent, or Firm* — Trop, Pruner & Hu, P.C.

(57) ABSTRACT

An embodiment includes a method executed by at least one processor comprising: determining inventories for first and second times for a first vending machine (VM); determining inventories for first and second times for a second VM; determining inventories for first and second times for a third VM; and determining a service route to visit the first and second VMs on a specific date, and to specifically avoid visiting the third VM on the specific date, in response to determining the inventories for the second times for the first, second, and third VMs. Other embodiments are described herein.

12 Claims, 30 Drawing Sheets

Related U.S. Application Data continuation of application No. 14/962,641, filed on Dec. 8, 2015, now Pat. No. 9,613,346.

(60) Provisional application No. 62/088,886, filed on Dec. 8, 2014.

(51) Int. Cl.
*G07F 9/02* (2006.01)
*G06Q 20/18* (2012.01)
*G07F 9/00* (2006.01)

(52) U.S. Cl.
CPC .............. *G07F 9/001* (2020.05); *G07F 9/002* (2020.05); *G07F 9/026* (2013.01)

(56) References Cited

U.S. PATENT DOCUMENTS

| | | | | |
|---|---|---|---|---|
| 5,844,808 | A * | 12/1998 | Konsmo | G07F 9/026 379/93.31 |
| 5,924,076 | A * | 7/1999 | Carr | G06Q 30/0205 705/7.34 |
| 6,181,981 | B1 * | 1/2001 | Varga | G07F 9/026 700/244 |
| 6,250,452 | B1 * | 6/2001 | Partyka | G07F 9/002 221/6 |
| 6,324,520 | B1 * | 11/2001 | Walker | G07F 17/3248 705/16 |
| 6,339,731 | B1 * | 1/2002 | Morris | G07F 9/026 700/244 |
| 6,985,871 | B2 * | 1/2006 | Simon | G06Q 10/06311 705/7.24 |
| 7,593,897 | B1 * | 9/2009 | Koi | G06Q 40/00 700/231 |
| 7,894,938 | B1 * | 2/2011 | Arora | G07F 9/026 705/28 |
| 8,191,779 | B2 * | 6/2012 | Illingworth | G06Q 20/16 700/231 |
| 8,325,036 | B1 * | 12/2012 | Fuhr | G06Q 10/087 705/28 |
| 2002/0016829 | A1 * | 2/2002 | Defosse | G06Q 20/3278 709/217 |
| 2002/0128932 | A1 * | 9/2002 | Yung | G06Q 30/0601 705/28 |
| 2002/0161475 | A1 | 10/2002 | Varga | |
| 2003/0074106 | A1 * | 4/2003 | Butler | G07F 5/18 700/236 |
| 2004/0117196 | A1 * | 6/2004 | Brockman | G06Q 40/12 705/332 |
| 2004/0133653 | A1 * | 7/2004 | Defosse | G07F 9/002 709/217 |
| 2005/0010500 | A1 * | 1/2005 | Coveley | G06Q 10/087 705/28 |
| 2005/0043011 | A1 * | 2/2005 | Murray | H04W 68/00 455/403 |
| 2005/0236253 | A1 * | 10/2005 | Shur | G07F 11/44 194/200 |
| 2006/0106490 | A1 * | 5/2006 | Howell | G07F 9/002 700/233 |
| 2006/0149415 | A1 * | 7/2006 | Richards | G07F 9/001 700/236 |
| 2006/0235739 | A1 * | 10/2006 | Levis | G06Q 10/08 705/1.1 |
| 2007/0050272 | A1 | 3/2007 | Godlewski | |
| 2007/0051796 | A1 | 3/2007 | Yoshizaki | |
| 2008/0140515 | A1 * | 6/2008 | Godwin | G07F 9/002 705/7.31 |
| 2009/0018695 | A1 * | 1/2009 | Kronenberg | G06Q 10/087 700/231 |
| 2009/0055281 | A1 * | 2/2009 | DeMedio | G06Q 20/202 705/21 |
| 2009/0164631 | A1 * | 6/2009 | Wooley | G07F 9/026 709/225 |
| 2009/0216665 | A1 * | 8/2009 | Merwarth | G07F 9/001 705/30 |
| 2010/0138037 | A1 * | 6/2010 | Adelberg | G07F 9/001 700/241 |
| 2011/0276364 | A1 * | 11/2011 | Bergstrom | G06Q 10/04 705/7.29 |
| 2014/0012414 | A1 * | 1/2014 | Perez | G07F 9/001 700/241 |
| 2014/0316875 | A1 * | 10/2014 | Tkachenko | G06Q 10/087 705/14.25 |
| 2014/0379123 | A1 * | 12/2014 | Hirshbain | G07F 9/002 700/243 |

OTHER PUBLICATIONS

"Coinco Expands Its Cashless and Telemetry Offerings." Automatic merchandiser 53.4 (2011): 10-. Print. (Year: 2011).*
Ben White. "How to Find Profits in Telemetry Data." Automatic merchandiser 55.3 (2013): 22-. Print. (Year: 2013).*
Jim English. "3 Telemetry Roadblocks and How to Find Solutions." Automatic merchandiser 55.4 (2013): 8-. Print. (Year: 2013).*
Refermat, Emily. "How to Start Prekitting: One of the Fastest Growing Trends in Servicing Vending Machines Has the Capacity to Increase Revenue 20 Percent Per Route." Automatic merchandiser 55.6 (2013): 19-. Print. (Year: 2013).*
You, Peng-Sheng. "A Heuristic Approach for Multiple Item and Location Ordering Problem with Quantity Discount and Capacity Constraint." The Journal of the Operational Research Society 56.3 (2005): 307-316. Web. (Year: 2005).*
Kant G, Jacks M, Aantjes C. Coca-Cola Enterprises Optimizes Vehicle Routes for Efficient Product Delivery. Interfaces. 2008;38(1): 40-50. doi:10.1287/inte.1070.0331 (Year: 2008).*
Cho, Dong Won et al. "An Adaptive Genetic Algorithm for the Time Dependent Inventory Routing Problem." Journal of intelligent manufacturing 25.5 (2013): 1025-1042. Web. (Year: 2013).*
Zhao, W. Y., & Zhang, B. (2013). Research on the optimization of inventory routing problem based on VMI-TPL mode. Applied Mechanics and Materials, 409-410, 1089. doi:http://dx.doi.org/10.4028/www.scientific.net/AMM.409-410.1089 (Year: 2013).*
Pinto, Fabio, et al., "Space Allocation in the Retail Industry: A Decision Support System Integrating Evolutionary Agorithms and Regression Models," INESC TEC/Faculdade de Engenharia, Universidade do Porto, 16 pages.
candymachines.com, "18 Column Snack Vending Machine, SNK18C" http://www.candymachines.com/18-Column-Snack-Vending-Machine-P1549.aspx, 4 pages.
wikipedia.com, "Economic order quantity," https://en.wikipedia.org/wiki/Economic_order_quantity, 5 pages.
wiley.com, "Equations for Inventory Management," http://www.wiley.com/legacy/wileychi/waters/supp/Equations.pdf, pp. 229-236.
allbusiness.com, "How to Forecast Inventory Needs," http://www.allbusiness.com/how-to-forecast-inventory-needs-12365224-1.html, 7 pages.
R.R. Lindkey, "Inventory Control Models: Ch 5 (Uncertainty of Demand)," IE 3265, Production And Operations Management, 29 pages.
ubalt.edu, "Inventory Control," http://home.ubalt.edu/ntsbarsh/business-stat/otherapplets/inventory.htm, 6 pages.
wikipedia.com, "Reorder Point," https://en.wikipedia.org/wiki/Reorder_point, 3 pages.
International Searching Authority, ""Notification of Transmittal of the International Search Report and the Written Opinion of the International Searching Authority,"" dated Mar. 23, 2016 in International application No. PCT/US2015/064395.
European Patent Office, Communication pursuant to Rules 70(2) and 70a(2) EPC dated Aug. 22, 2018 in European patent application No. 15867094.3, 10 pages.
Mexican Patent Office, Office Action dated Sep. 23, 2021 in Mexican Patent Application No. MX/a/2017/007434 (7 pages).
European Patent Office, Office Action dated Nov. 19, 2019 in European Patent Application No. 15867094.3 (10 pages).

(56) References Cited

OTHER PUBLICATIONS

Mexican Patent Office, Office Action dated Jan. 10, 2022 in Mexican Patent Application No. MX/a/2017/007434 (13 pages).

* cited by examiner

Work Order - 34904: Back of Store

| Products | Par | Restock Cases | Restock Units |
|---|---|---|---|
| Bottled Drinks | 24 | 2 | 0 |
| Candy | 24 | 1 | 10 |
| Canned Drinks | 24 | 2 | 0 |
| Iced Tea & Coffee & Flavored Waters | 24 | 0 | 23 |
| LSS Chips | 24 | 0 | 9 |
| Pastry | 24 | | |
| Snacks | 24 | 1 | 8 |
| Water | | | |

Make Visits

FIG. 16

Unload Truck: Mixed Truck sort by

| Product | Category | Estimated On Truck | Unload Cases | Unload Units | Stales |
|---|---|---|---|---|---|
| Mug Root Beer 20 oz | Bottled Drinks | cases: 1 units: 7 | 0 | 0 | 0 |
| Pepsi 20 oz | Bottled Drinks | cases: 0 units: 0 | 0 | 0 | 0 |
| Pepsi Max 20 oz | Bottled Drinks | cases: 0 units: 20 | 0 | 0 | 0 |
| Tropicana Lemonade 20 oz | Bottled Drinks | cases: 0 units: 0 | 0 | 0 | 0 |
| 3 Musketeers 10/36ct Pkg | Candy | cases: 0 units: 0 | 0 | 0 | 0 |
| Dove Dark Chocolate 1.45 oz Pkg | Candy | cases: 0 units: 0 | 0 | 0 | 0 |
| M&M Peanut 8/48ct Pkg | Candy | cases: 0 units: 0 | 0 | 0 | 0 |
| Payday 12/24 ct Pkg | Candy | cases: 0 units: 0 | 0 | 0 | 0 |
| Reeses Peanut Butter Cup 9/36ct Pkg | Candy | cases: 0 units: 0 | 0 | 0 | 0 |

Review/Finalize

FIG. 20

Audit Truck: Mixed Truck

< Audit Truck?

Add New Product sort by
[Product]

| Product | Category | Case Size | Actual Cases | Actual Units | Stales |
|---|---|---|---|---|---|
| Mug Root Beer 20 oz | Bottled Drinks | 24 | 0 | 0 | 0 |
| Pepsi 20 oz | Bottled Drinks | 24 | 0 | 0 | 0 |
| Pepsi Max 20 oz | Bottled Drinks | 24 | 0 | 0 | 0 |
| Tropicana Lemonade 20 oz | Bottled Drinks | 24 | 0 | 0 | 0 |
| 3 Musketeers 10/36ct Pkg | Candy | 36 | 0 | 0 | 0 |
| Dove Dark Chocolate 1.45 oz Pkg | Candy | 18 | 0 | 0 | 0 |
| M&M Peanut 8/48ct Pkg | Candy | 48 | 0 | 0 | 0 |
| Payday 12/24 ct Pkg | Candy | 24 | 0 | 0 | 0 |
| Reeses Peanut Butter Cup 9/36ct Pkg | Candy | 36 | 0 | 0 | 0 |

●————●————Review/Finalize

FIG. 22

VENDING MACHINE ROUTE MANAGEMENT

CROSS-REFERENCE TO RELATED APPLICATION

This application is a continuation of U.S. patent application Ser. No. 15/474,481, filed Mar. 30, 2017, which is a continuation of U.S. patent application Ser. No. 14/962,641, filed Dec. 8, 2015, now U.S. Pat. No. 9,613,346, issued Apr. 4, 2017, which claims priority to U.S. Provisional Patent Application No. 62/088,886 filed on Dec. 8, 2014 and entitled "Vending Machine Route Management Through Real-time Telemetry Combined with SmartPhone Application." The content of each of the above applications is hereby incorporated by reference.

TECHNICAL FIELD

Embodiments of the invention are in the field of vending machines.

BACKGROUND

The traditional organization of vending machines within a large vending and/or remote point of sale network utilizes the concept of a "route" of machines. Each route is a grouping of machines by geographic proximity, customer and/or client association, or other grouping method. These routes are then managed on a day-to-day basis by one or more route drivers who have the responsibility for maintaining the stock inventory within these machines as well as to collect the cash sales receipts from each. The fact that these machines typically contain several days' worth of inventory drives several aspects of traditional route creation and management strategy. Simply put, the number of machines per location and inventory on hand must be defined such that each machine within the route does not need service each day. Instead, the route is made up of a large number of machines, many more than can be visited in a single day, and the route manager selects the machines to visit each day. This also implies that that the route manager makes a decision as to the machines that are "safe" to skip for that day and may be visited in the future without sold-out or other revenue affecting issues. This skip vs. visit ratio can be as high as 12 or 15 to 1.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIGS. 1-23 include user interfaces for use in an embodiment.

DETAILED DESCRIPTION

Figure 1:
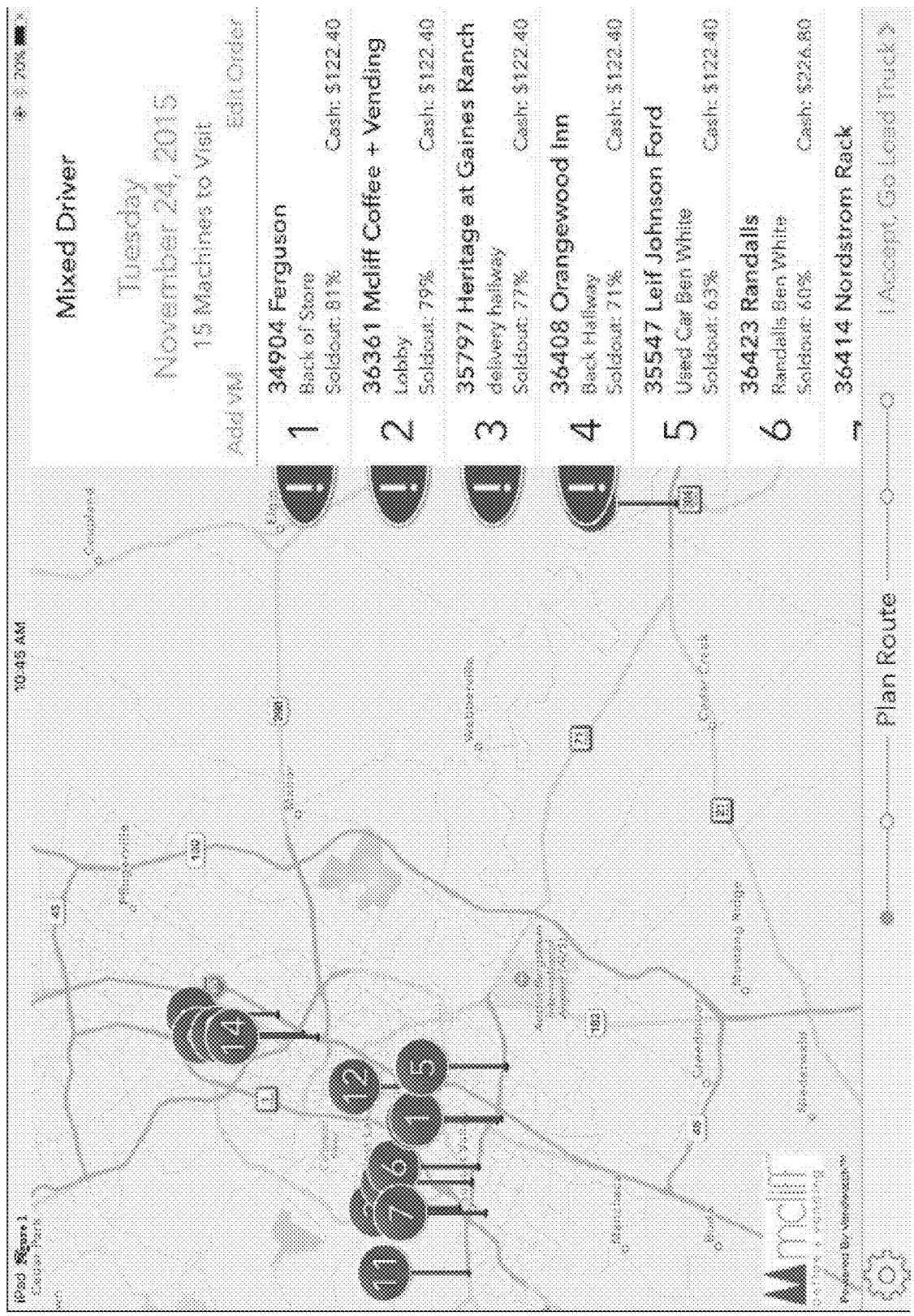

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

Applicant has analyzed the above background information and determined several problems exist with conventional machine service protocols.

Applicant has determined the selection of machines to visit vs. which machines are safe to skip each day is critical to the profitability and success of the vending operation. This criticality is based on at least the following three issues. First, each visit to a machine has a relatively fixed cost which includes wages for the driver, transportation expenses, depreciation of corporate assets, and others. Second, each machine or close grouping of machines (located next to each other) has a relatively fixed maximum production potential. This is generally the calculation of product inventory on hand divided by the rate-of-consumption (RoC) for each product. This calculation provides the maximum amount of time selling in the market without losing any sales due to a sold-out condition that each machine or grouping can sustain. Third, route drivers must load new inventory to be stocked at the beginning of each day (or, more generally, product delivery cycle which may be begin at any time) prior to beginning the route. A desirable truck loading strategy is one where the truck contains only the stock that is needed to fully stock all machines for that day based upon the actual contents remaining in each machine at the actual time of the visit.

Applicant determined profitable vending operations must balance these three parameters such that the route manager visits only the maximally profitable machines so the sales receipts collected are maximized vs. the fixed expense of the visits. This system must be maintained by precisely accurate stocking of the truck at the start of the day and along the route such that each visited machine is stocked to its maximum production capacity. The route truck should leave the warehouse containing no more or no less stock than is needed to perform this exact restock strategy (although a small "safety" excess of inventory may be carried on the truck).

Applicant determined how, previous to the embodiments described herein, vending managers rely on non-integrated tools as well as personal experience and intuition to provide the daily route and stock information for a fleet of route drivers. In addition, there is usually significant variation in the opinions and practices of individuals such that each driver may have his or her own habits and opinions of best practices with no tools to guide or marshal the fleet into a common workflow and optimal behavior. Applicant determined this conventional system is lacking in several key aspects and cannot provide the real-time analysis that maximizes profits, maximizes customer satisfaction, and provides measurable and repeatable results.

Applicant determined an additional problem exists in the conventional system regarding what is called space-to-sales (StS). Each vending machine has a limited number of user selection buttons as well as a limited amount of inventory on hand that may be assigned to each selection. This assignment is known as that machine's StS ratio. It is intuitive to assign more inventory in a machine to a highly popular product. However, current practices utilize very subjective data which is often based solely upon personal opinion instead of measured information. This leads to reduced maximum sales production for the machines involved. However, as described herein, embodiments allocate the actual StS based on telemetry data, RoC predictions, as well other calculated factors.

An embodiment includes a system of integrated telemetry, applications, and workflows that manages aspects of the problems described above and provides maximum/increased benefit to management, drivers, and vending clients. An embodiment removes/lessens the subjectivity concerning space to sales assignment as well as provides a managed workflow to align the route management personnel to the corporate practices of marketing and brand management. In other words, embodiments described herein ensure the correct machines are visited, those machines are properly stocked when visited, the warehouse/truck inventory exchanges are efficient (i.e., loading of truck and unloading of the truck), and the work flow for each driver/work order is repeatable and systematic—all of which promote profitability.

Figure 24:
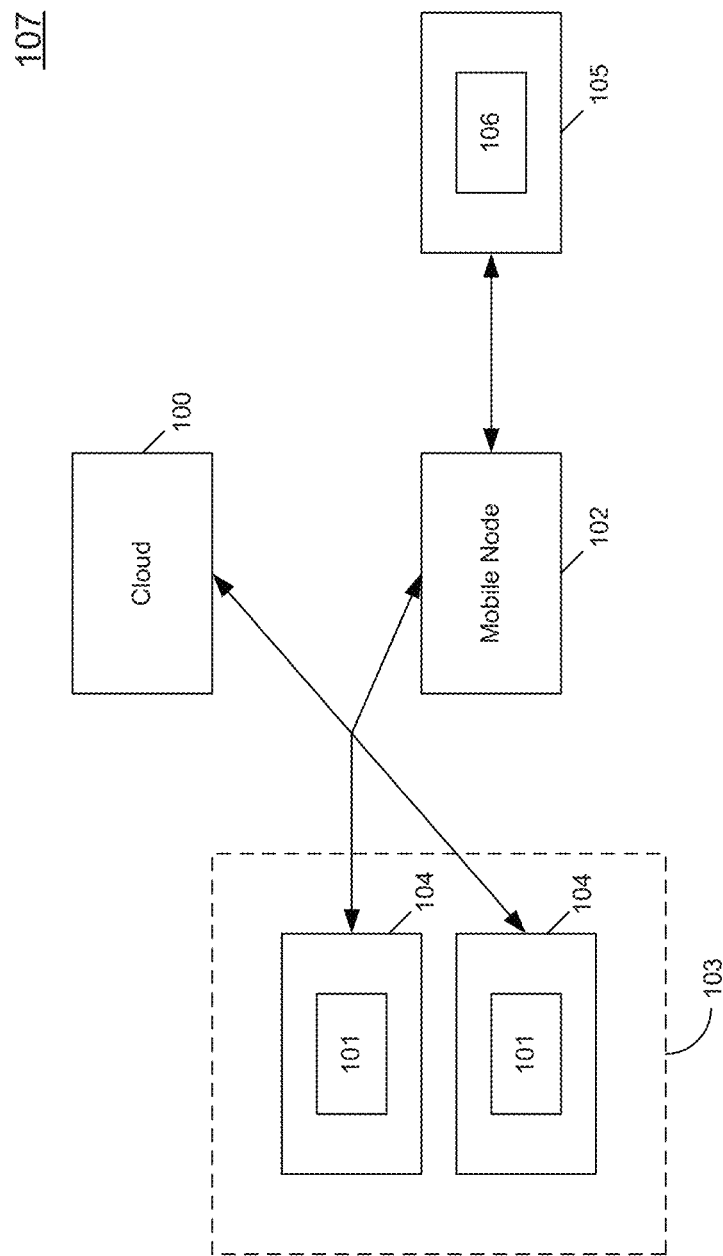
FIG. 24 includes a system embodiment of real-time telemetry devices, a central, cloud-based compute facility with a user interface, and a series of wireless smart-phone devices running a set of applications.

FIG. 24 includes an embodiment comprising a system of real-time telemetry devices, a central, cloud-based compute facility with a user interface, and a series of wireless smart-phone devices running a set of applications. Such an embodiment includes a system 107 with the following seven subsystems.

First, a central, cloud-based application platform 100 that contains the following subsystems: (a) central database serving as the system of record for services, (b) wide area network (WAN) telemetry gathering and processing services, (c) WAN smartphone/mobile application "back end" services, (d) browser based console and reporting interfaces, and (e) application program interface (API) and import/export services. See, e.g., FIG. 30 for an example of computing node 100.

Second, an embodiment includes a vending telemetry device 101 that contains: (a) a conventional multi-drop bus (MDB) based controller card/interface providing telemetry and cashless services, (b) a data exchange (DEX) file (a form of digital vending record) or other transaction recording services, (c) a WAN wireless interface for dialog with the cloud platform 100 and/or mobile node 102, and (d) proximity wireless capability (e.g., Bluetooth® Low Energy) for dialog with a mobile phone application 102. Such a telemetry device is discussed at, for example, PCT Patent Application Publication No. WO/2015/148409 (assigned to VENDWATCH TELEMATICS, LLC), and/or U.S. Patent Application Publication No. US2015/0100152 (assigned to VENDWATCH TELEMATICS, LLC), and/or U.S. Pat. No. 9,111,405 (assigned to VENDWATCH TELEMATICS, LLC) (see, e.g., vending interface unit (VIU) and vending machine controller card (VMCC)).

Third, a mobile computing node (e.g., Smartphone/Smart Pad) application 102 that provides: (a) intuitive visual workflow for driver interaction, (b) real-time wireless dialog with cloud computing resource 100 for application processing, and (c) real-time wireless dialog with device 101 for control and monitoring of the vending machine. See, e.g., FIG. 29 for an example of a computing node 102.

Fourth, a collection 103 of individual vending machines 104 organized into a logical route. Fifth, a standard MDB enabled vending machine 104. Sixth, a service vehicle (aka "truck") 105 driven to service the route. Seventh, a route driver individual 106 who manages the daily operation of a specific route.

In an embodiment, the operation of system 107 begins with the first use of the mobile application 102 (102 is used to refer to the node itself, including a physical processor, and/or the application executed by the processor) in the field to provision a vending machine into the online system 100 (100 is used to refer to the node itself, including a physical processor, and/or the application executed by the processor) (i.e., on-boarding of the machine). At this point, configuration and parameterization information for that specific machine 104 is entered into the online system. In an embodiment, this information contains or pertains to (but is not limited to) the following. First, installation of the wireless telemetry device 101 and assignment of a unique identifier of the device to a specific vending machine 104. Second, assignment of that machine to a specific route group (e.g., northwest Austin, Tex., U.S.A. route area X). Third, assign a geographic location (e.g., based on GPS, text description (see, e.g., FIG. 3 indicating a machine is in the "lobby", and the like) of the machine so a new driver can quickly locate the machine. Fourth, include photographs of the current condition of the machine (see, e.g., photos at FIGS. 3 and 6). This allows for ready identification of the machine for a new driver and also establishes a base condition in case of vandalism and the like. Fifth, provide any notes regarding access (e.g., driver must check with security guard located in the "Vending Machine Notes" field at FIG. 6) or other useful information for daily maintenance. Sixth, establishment of the current Plan-o-Gram (PoG) and selection inventory for the machine (see, e.g., FIG. 12). Seventh, initial sales and inventory record (e.g., via DEX or other means) are recorded.

As used herein, POGs are representations of a vending machine's products or services and may be considered a tool for visual merchandising. In an embodiment, a POG is a diagram or model that indicates the placement of retail products on shelves or within spaces of the vending machine in order to maximize sales. POGs therefore help dictate a merchandising unit's (e.g., vending machine) layout of merchandise. A PoG may shows X amount of product A should be above Y amount of product B. A change to the PoG may increase the amount of product A and decrease the amount of product B.

Once the machine 104 has been successfully provisioned into the online system, the telemetry device 101 begins a periodic (e.g., hourly, daily) transmittal of incremental sales information (e.g., inventory, sales receipts) to the online processing system 100. This information enables the online system to begin processing a set of logical rules for pattern detection and matching such that the raw telemetry data is processing and mapped against the business logic of the vending operation. Information obtained from this processing procedure includes (but is not limited to): (1) hourly rate of consumption prediction by product for each machine, (2) machine sales production maximum (referred to above as "maximum production potential") and performance against this limit, (3) sales receipts expected at any given time of a route driver visit, and/or (4) product and brand performance by machine, by route, and by network. This information (some or all or similar) is made available in a variety of ways which include online consoles, export to back-office business systems, and the like. In an embodiment, this dynamic process information (along with static provisioning information) is used to drive the daily usage of the mobile smartphone application by the route driver.

Figure 27:
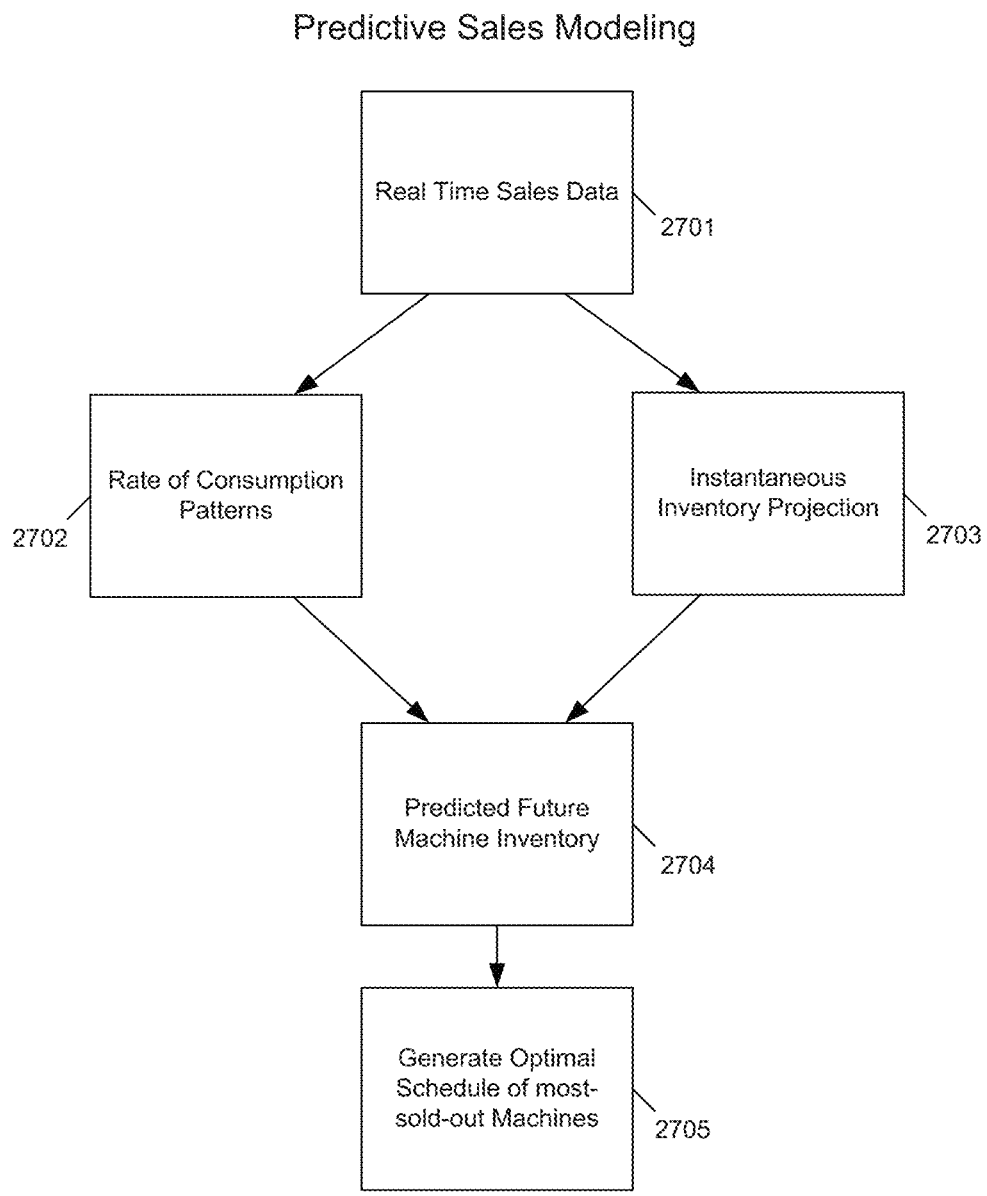
FIG. 27 includes a process in an embodiment.

For example, node 100 may include a predictive sales modeling engine or module. FIG. 27 includes a process implemented by the module. Block 2701 includes obtaining real time sales data from a machine. Block 2702 includes determining a RoC for each product of that machine (which may be compared to other RoCs for other machines nearby or far away). Block 2703 includes obtaining an instantaneous inventory projection. This entails the best estimate of what inventory that machine has in real time, based in response to the original inventory amount and the real time data from block 2701. In response to blocks 2701, 2702, 2703, in block 2704 a predicted future machine inventory is determined. In response to the preceding steps, in block 2705 an optimal schedule or route is determined to service the most in-need machine first (e.g., the machine at risk for greatest loss of revenue). Note, for example, machines in scheduled slots 1-4 with "!" marks. These four machines all exceed a threshold that triggers their alert "!" status. For example, that may be based on block 2704 determining inventory will run out for machine on a particular day. However, that threshold may be based on other values such as, for example, a cash amount being exceeded. For example, in FIG. 1 the prediction is that the machine at 34904 Ferguson has $122.40. A threshold may exist for that particular machine that any time it has over $100 it should be service immediately.

Methods employed at block 2704 are varied. For example, inventory control models (e.g., single period stochastic inventory models) known to those of ordinary skill in the art may be used in some embodiments. Models may be based on, for example, economic order quantity (EOQ), reorder point (ROP), and the like known to those of ordinary skill in the art.

Figure 28:
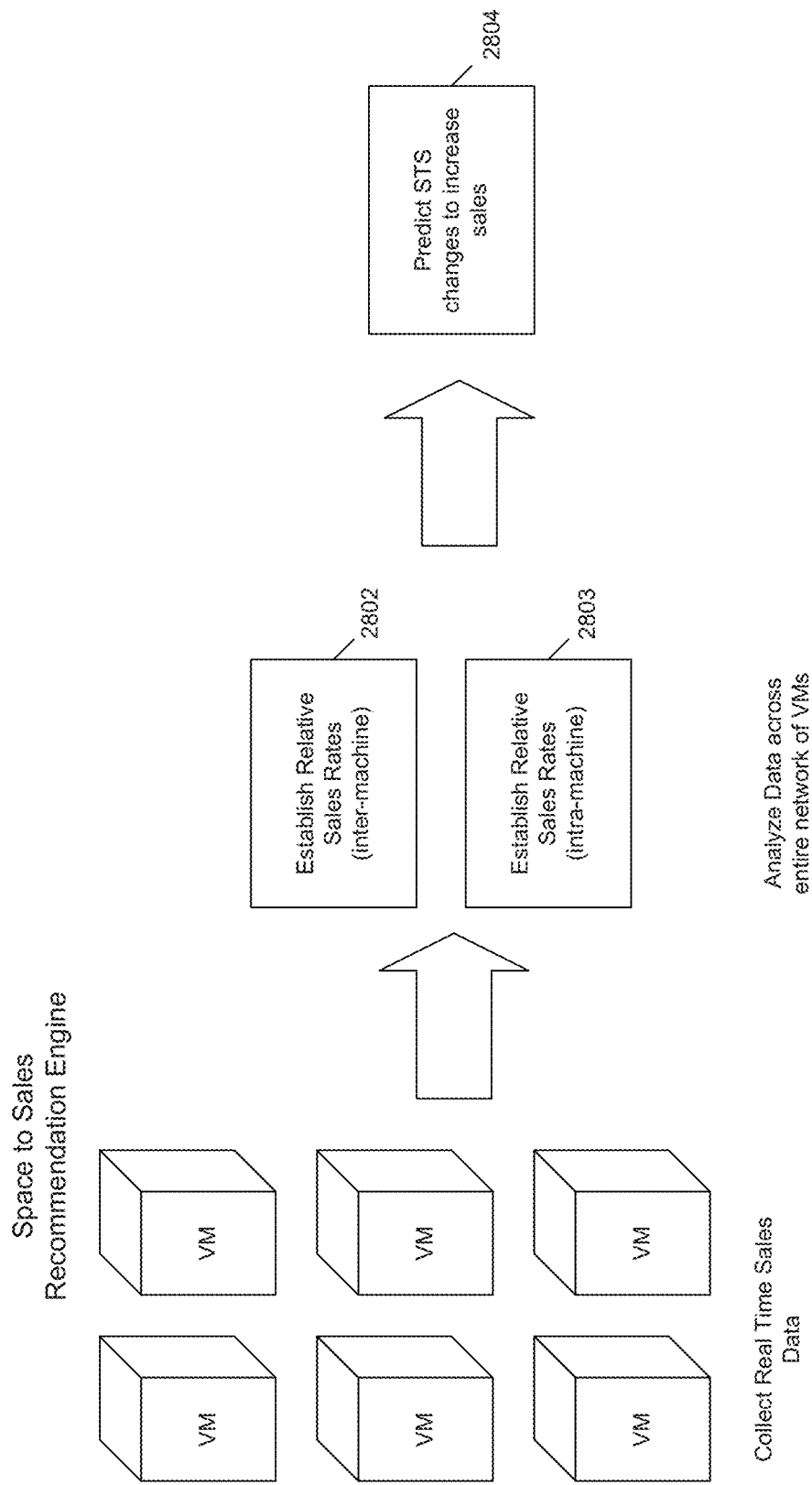
FIG. 28 includes a process in an embodiment.

These same models, as well as other models, may be used to manage StS. Other models include, for example, space elasticity modeling (space elasticity is the impact on the sales of a given product or product category of varying (typically 1%) the space allocated to it), and heuristic optimization-based methods and other models known to those of ordinary skill in the art. FIG. 28 generalizes an embodiment of this decision making for StS. FIG. 28 includes a StS Recommendation engine or module. At 2801 real time data is collected from one or more machines. At 2803 relative sales rates within a machine are determined (e.g., product A vs. product B in a machine). At 2802 relative sales rates between machines are determined (e.g., product A for machine 1 vs. product B for machine 2). Based on this analysis, a StS change may be proposed (e.g., see FIG. 2).

Figure 25:
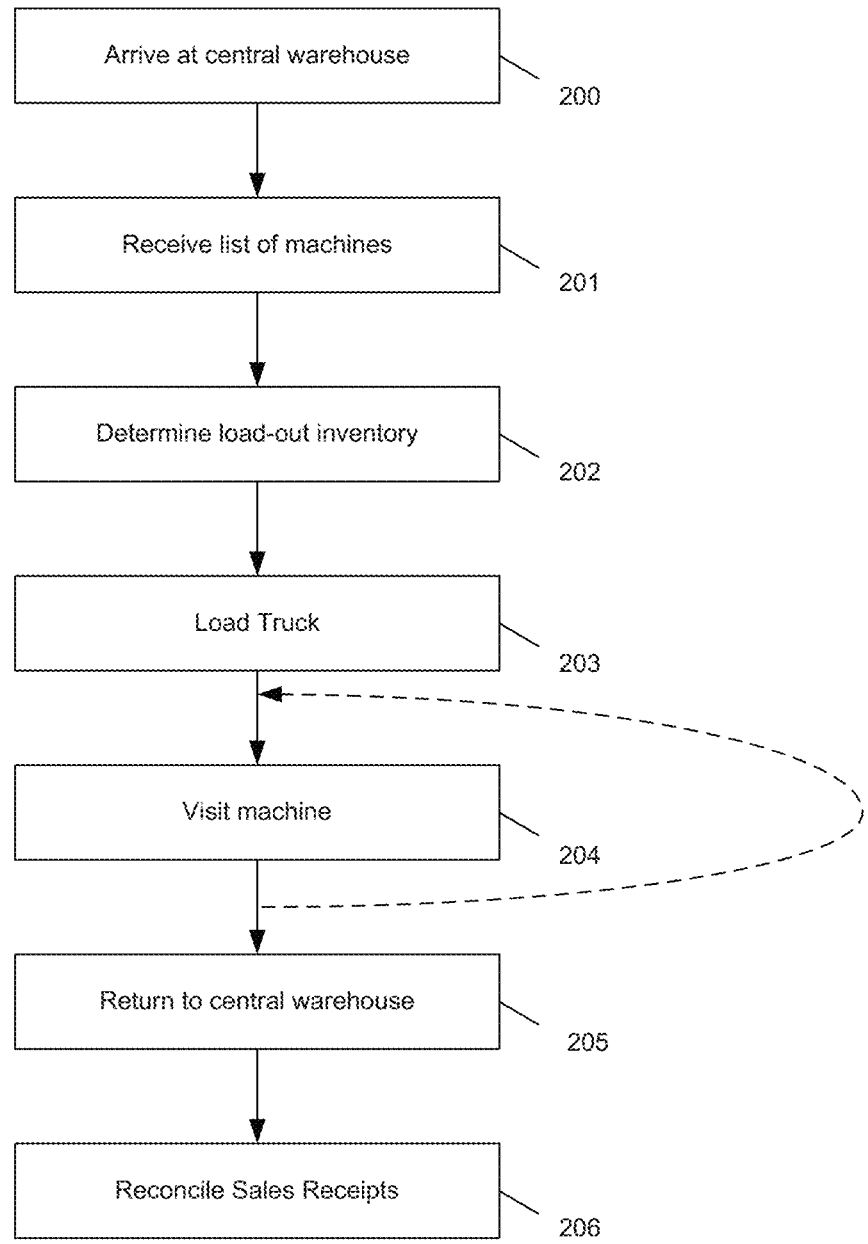
FIG. 25 includes a process in an embodiment.

On any given day, a vending route driver's tasks are broken down into the following sequential series as shown in FIG. 25. At block 200 the driver arrives at the central warehouse with the truck to be used that day, receives the list of machines to be visited that day (block 201), and determines the inventory that must be loaded onto the truck to satisfy the day's restock needs (block 202). The truck may or may not contain residual inventory from the previous driver or previous day. The driver then loads and takes ownership of the truck inventory and departs the warehouse (block 203). The driver visits a machine or grouping of machines (block 204).

Figure 26:
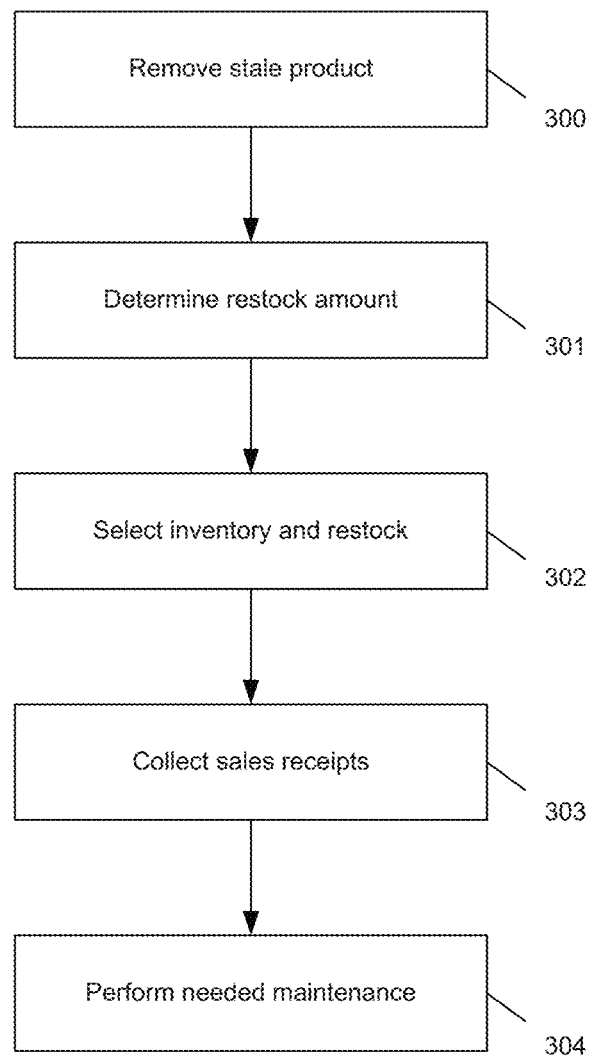
FIG. 26 includes a process in an embodiment.

When visiting a machine, in an embodiment (See FIG. 26) the driver removes any stale or out-of-date product from the machine (block 300), determines the amount of inventory needed to fully restock the machine (block 301), removes the required inventory from the truck, transports it to the machine, and performs the restock (block 302), removes and/or records collected sales receipts in the form of actual cash currency or noting cashless sales to date (block 303), and performs any required maintenance for that machine such as cleaning or configuration of product/price (block 304).

Returning to FIG. 25, at the end of the day, once the daily route is complete, the driver reconciles the remaining inventory on the truck and possibly returns it to the central warehouse (block 205). The driver reconciles cash and cashless sales receipts collected during the day with back-office accounting (block 206).

In an embodiment, some or all aspects of the daily task list described above (FIGS. 25 and 26) are defined and marshalled by online information (node 100) and a workflow interface provided by the mobile device 102 application. All driver daily activities are described by a common workflow that enables common behavior that is repeatable and measurable. The following is a task-by-task description of how the system delivers the features of this invention.

Again referring to FIG. 25, the driver arrives to work and "logs in" to the smartphone application (block 200). All necessary notifications, alerts, and the like are presented to the driver in preparation for the day's work. Any truck maintenance or inventory management is displayed in a series of work orders to the driver such that they may be quickly processed with results validated by the online application.

In block 201 the central processing system utilizes the prediction logic and the hourly sales information to automatically generate the list of machines to be visited that most precisely match the most profitable set of machines. As described above, profitability is determined by the processing of real-time machine data, inventory remaining, sales receipts expected, and the like against the somewhat fixed cost of the driver's visit. This process removes all subjectivity from the selection of the day's machines. Instead, the vending operation is assured that each driver is maximizing profits and customer satisfaction by relying upon the processing application and corporate policies. In an embodiment the application allows for manual override and manual sorting of this list such that the driver can practically respond to unusual circumstances. However, the normal operation policy is that the driver follows the list as displayed in the smartphone application as in FIG. 1.

FIG. 1 shows a driver of a mixed route (e.g., beverages and snacks) has been tentatively assigned 15 machines to visit for Nov. 24, 2015. The first four machines are assigned priority "!" status (which is the reason they are the first four machines listed). A priority status may be assigned based on the forecast tool. For example, machines slotted 1-4 all have an "!" to indicate they need service based on a projected "sold out" status for inventory, an threshold of cash being exceeded, and the like. In contrast to conventional logic, in an embodiment the machines are prioritized not on geography but on total profitability for the route.

Figure 2:
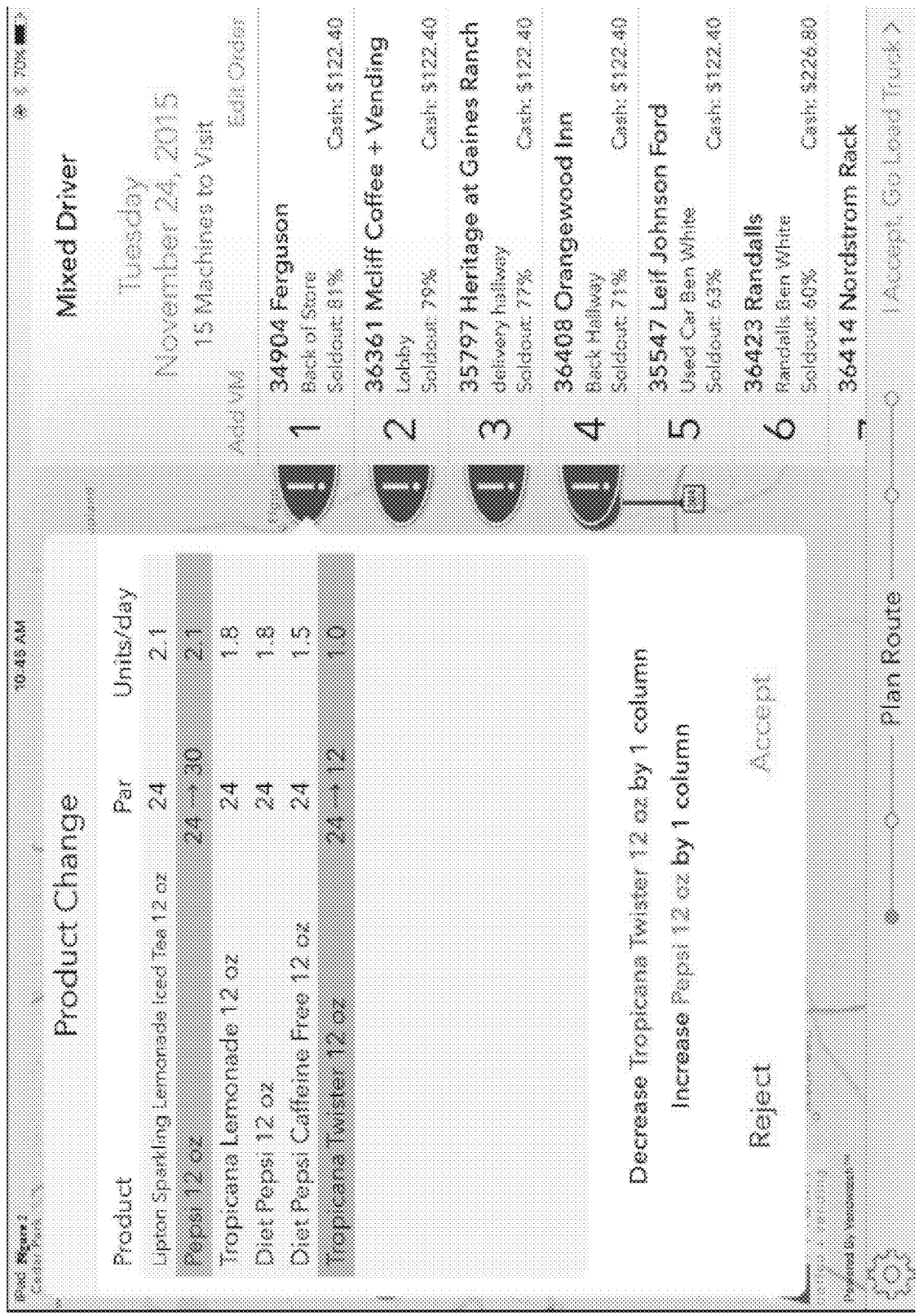
Figure 3:
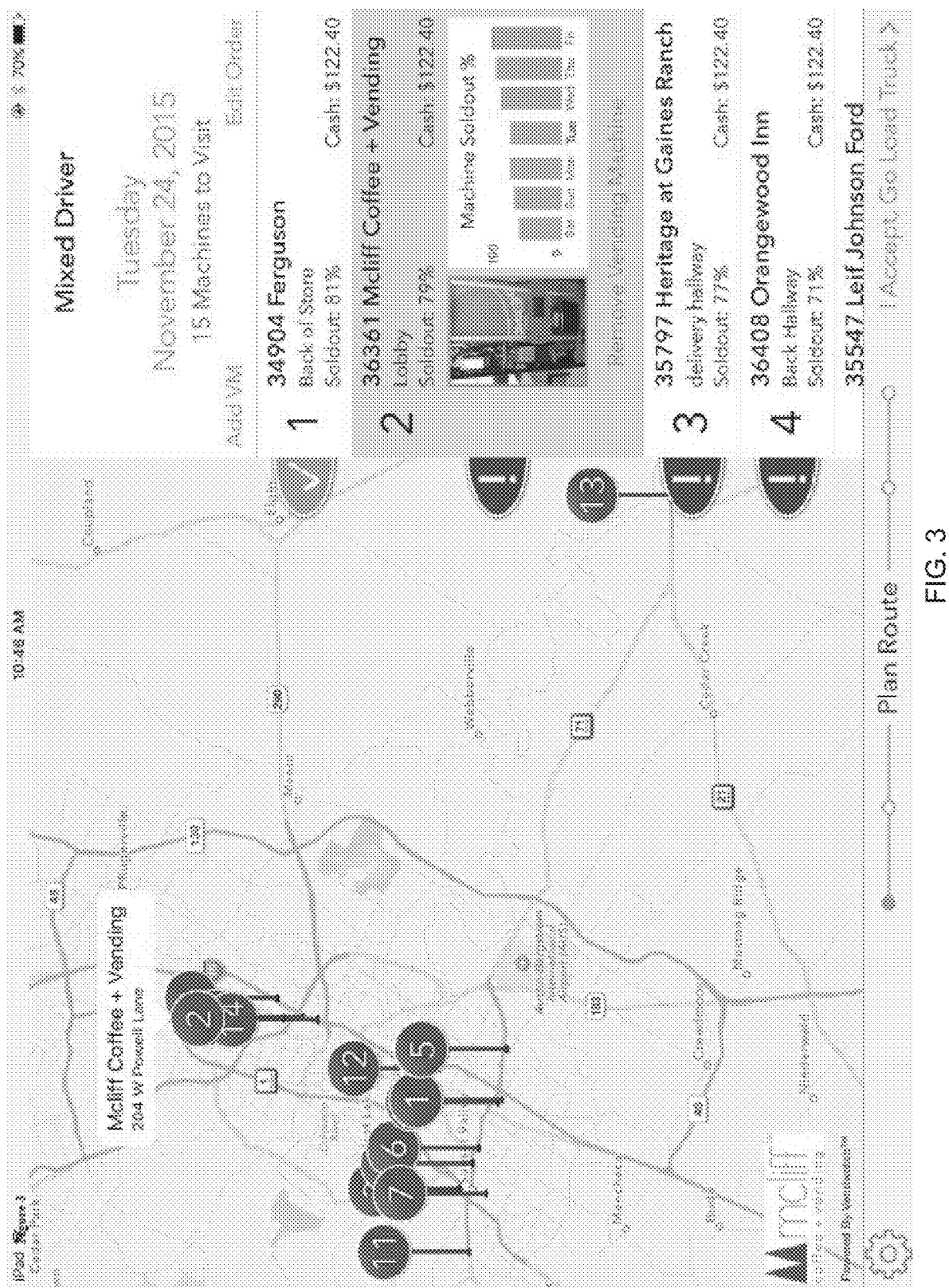

Before accepting the route, the on-line system 100 may propose a StS based change. For example, in FIG. 2 a product change is suggested to increase the inventory of one project and decrease the inventory of another product. The suggestion is either accepted or rejected, as shown in FIG. 2. This StS optimization may be made for each machine. As seen in FIG. 3, the driver may review each machine. As shown in FIG. 3, the second slotted machine may run out of product on the current day. The machine may be slotted second instead of first because the forecast is that the inventory for the second machine will last past the early morning and that the first machine may be serviced before the second slotted machine is out of inventory for any particular product.

In block 202, once the daily list has been defined and accepted (see FIG. 3 and the "I accept, go load truck" prompt), the required inventory is calculated based upon previous information about, for example, product inventory and rate of consumption. In addition, an embodiment refines this prediction by factoring in aspects of the future day such as predicted time of visit, predicted RoC by product, and the like. For example, if there is a high RoC for product A and the visit to the machine will not be until the end of the route, the restock value for product A will increase relatively significantly. This results in a highly accurate predicted restock inventory requirement (which avoids, for example, return visits to a truck to get more inventory to fully stock a machine that had less inventory than expected when the day's activities began).

This same processing and prediction analysis described above with regard to inventory may be done for the expected sales receipts for each machine (i.e., the higher the rate of consumption and the later the time of visiting the machine, the higher the forecasted amount of receipts). See, for example, the $122.40 value for the first slotted machine in FIG. 1. Prior to starting the day, the processing logic makes a precise calculation of the expected receipts of the day. This invention provides support for honesty and audit policy/procedure for the back office operation. This is in contrast with conventional systems that provide no such forecasting.

Block 203 includes how using the predicted day's inventory, the smartphone application 102 marshals the loading process onto the truck by automatically listing and keeping tally of the progress. The application can be integrated with back-office inventory systems, scanners, and radio frequency identification (RFID) systems to speed this process. Drivers interact with the application in the same way producing a validated load-out process that results in confirmed value and quantity of inventory transferred during this task.

Figure 4:
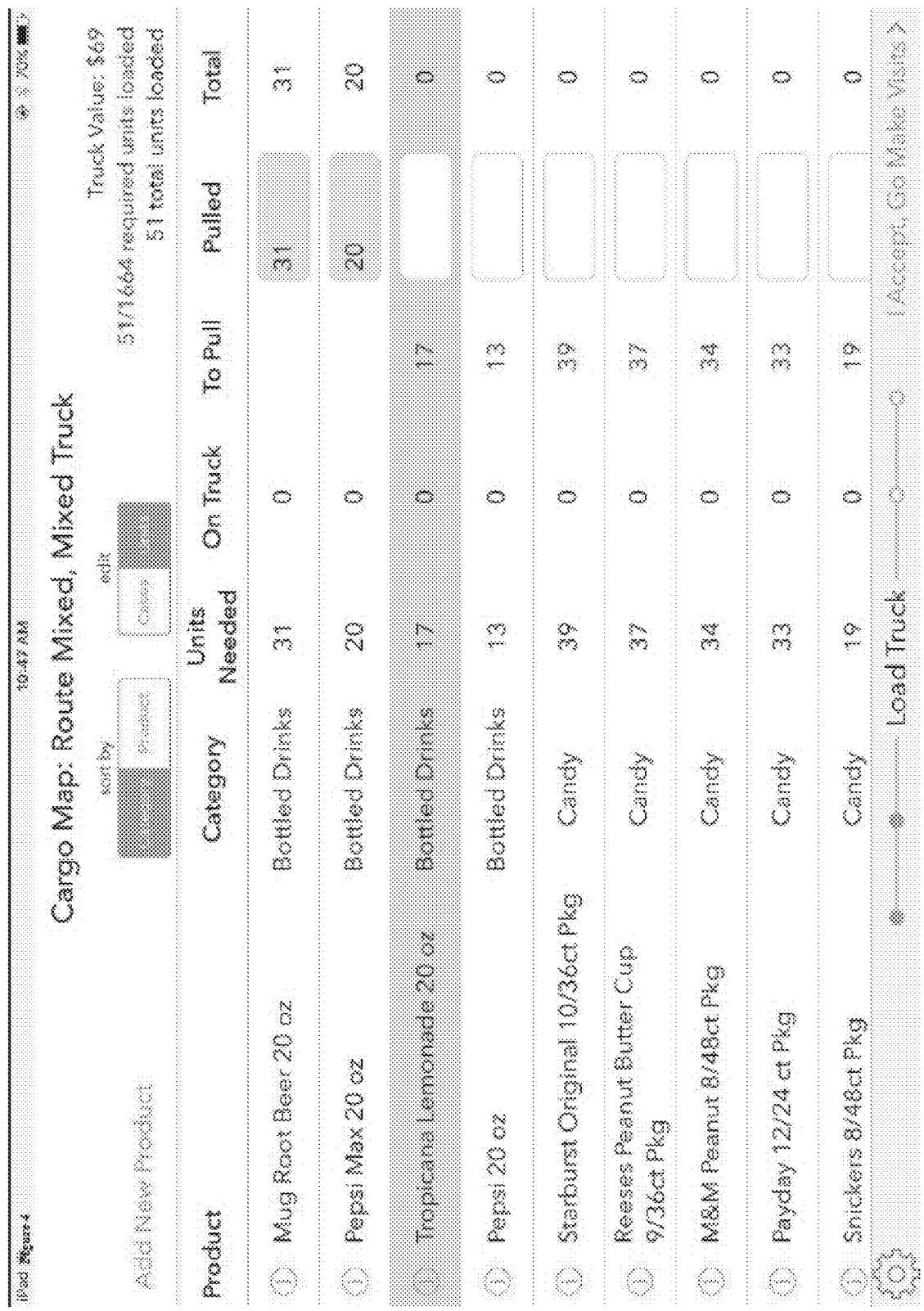

Thus, in FIG. 4 the entire "pull list" for the driver's entire route is shown. FIG. 4 shows the first two products have been pulled but remaining products still need to be gathered. The pull list may be organized by category of product or by product, and by cases of product or units of product. The "truck value" increases as more and more product is loaded, keeping costs and value at the forefront of the driver's attention. After loading, the user is prompted in FIG. 4 with "I accept, go make visits" to ensure the driver is accountable for what is or is not in his or her truck.

Block 204 concerns the actual visit to machines beginning with the driver consulting the application for the next machine to visit. This list is the product of not only the predictive processing that took place at the start of the day but also by factoring in any real-time telemetry that may have been impactful to the daily priorities (e.g., if the fourth slotted machine has experience higher than projected morning sales the restock value for the item that is selling well may be increased by drawing from a safety stock on the truck or from inventory destined for the $15^{th}$ machine on the list). In any case, the driver follows the direction of the application in proceeding to the next machine to visit. This series of actions is described later in blocks 300-304 (FIG. 3) and these represent a core aspect of an embodiment: the removal of all or a significant amount of subjectivity from the daily operations of vending route staff. Instead, the embodiment provides full or significant determinism of tasks, priorities, and results.

Figure 5:
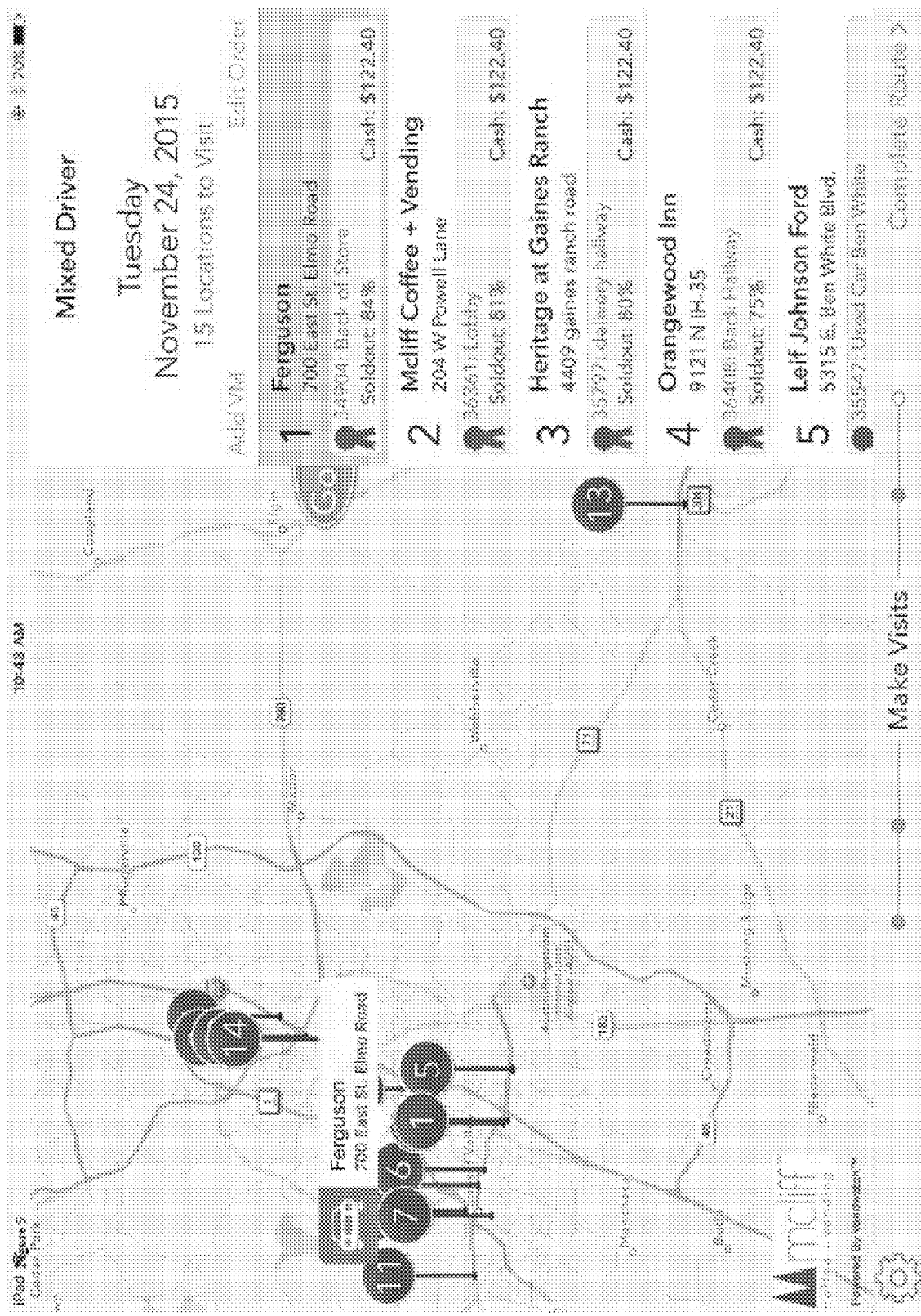

FIG. 5 shows the driver is in "go" status for the first slotted machine. The use of the ribbons indicates these machines will likely only require a single visit. For example, if the first slotted machine is on the $8^{th}$ floor of a high rise, the driver may be very interested to know the machine will likely need only a single visit that day. The driver may, for example, simply need to re-stock the machine and may not need to swap out telemetry units and the like (things that might necessitate the driver going back and forth to his or her truck).

Figure 6:
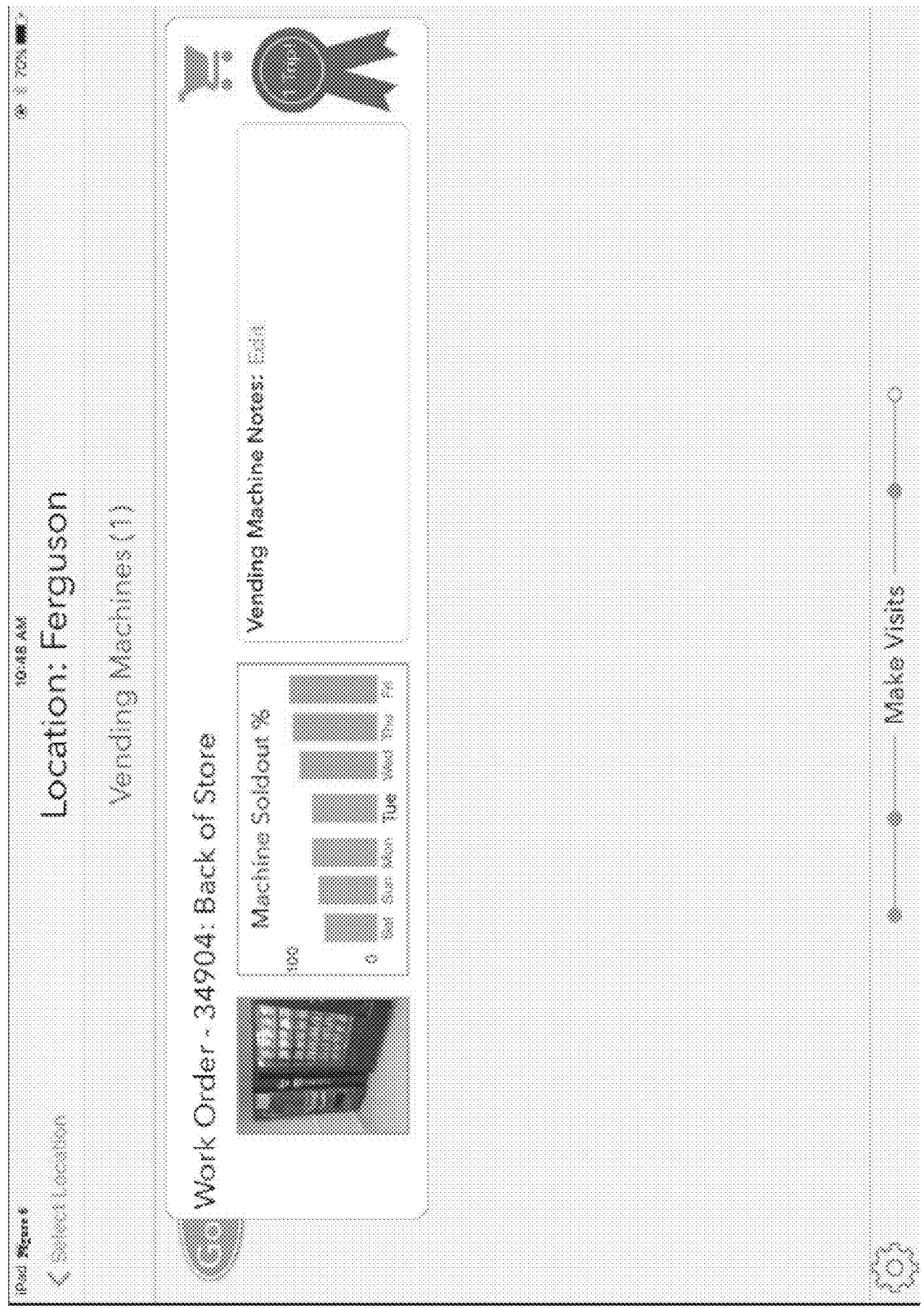
Figure 7:
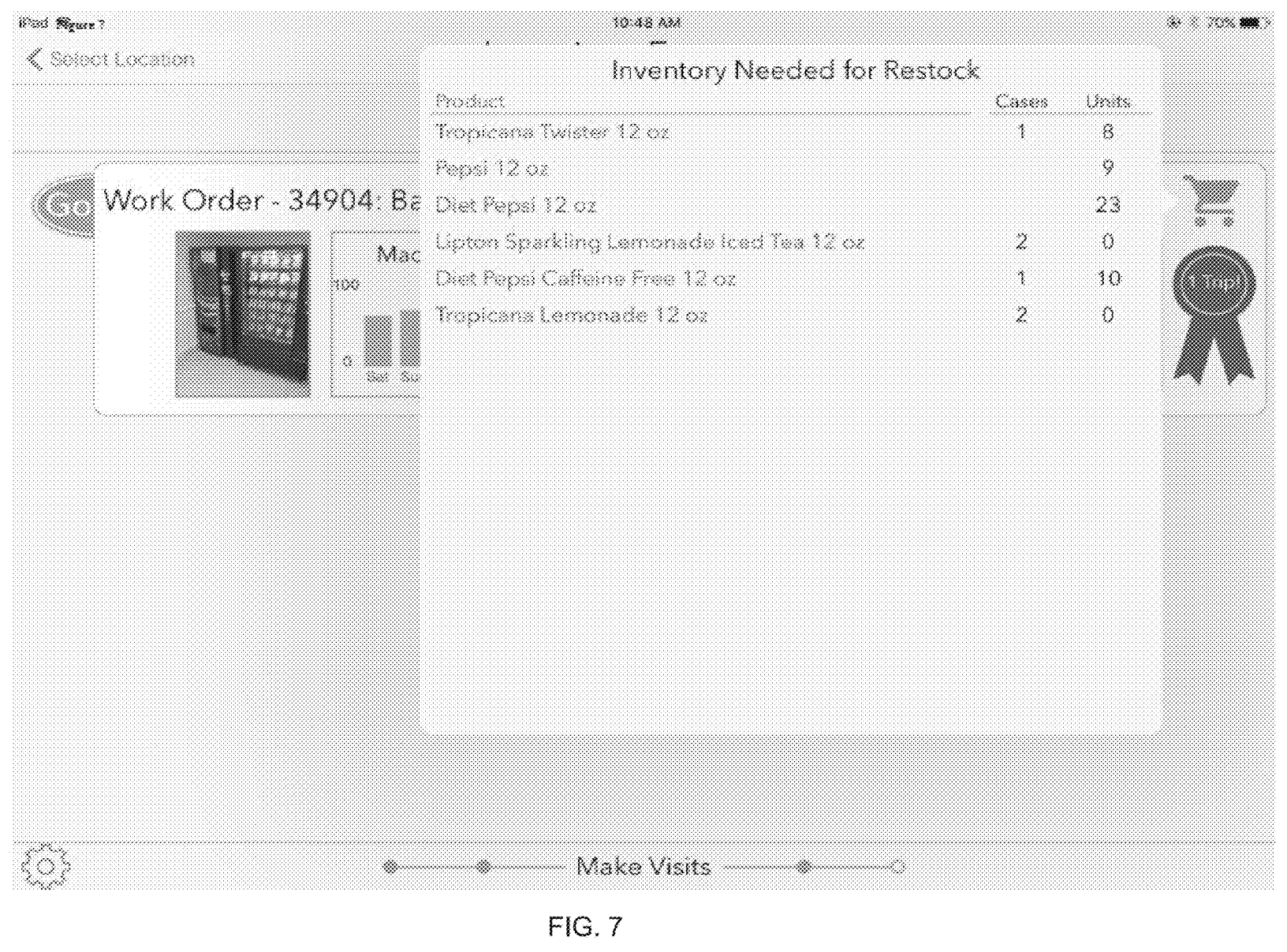

FIG. 6 shows the work order for the driver once the driver arrives at the site. He can quickly see any notes to observe (e.g., a passcode to a gated entry). He also sees a picture of the machine he will visit. FIG. 7 shows the inventory he should bring to the machine.

Figure 8:
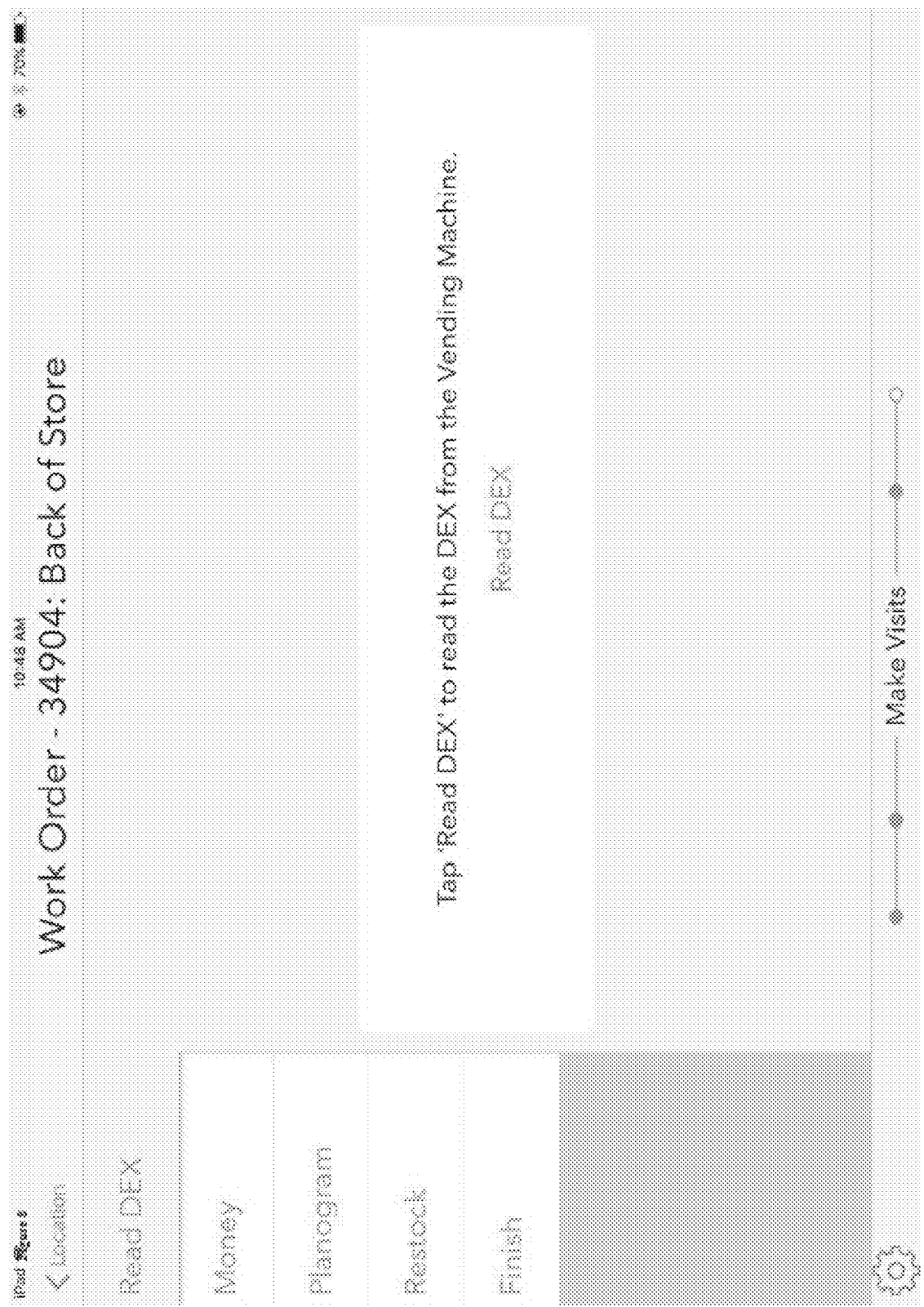
Figure 9:
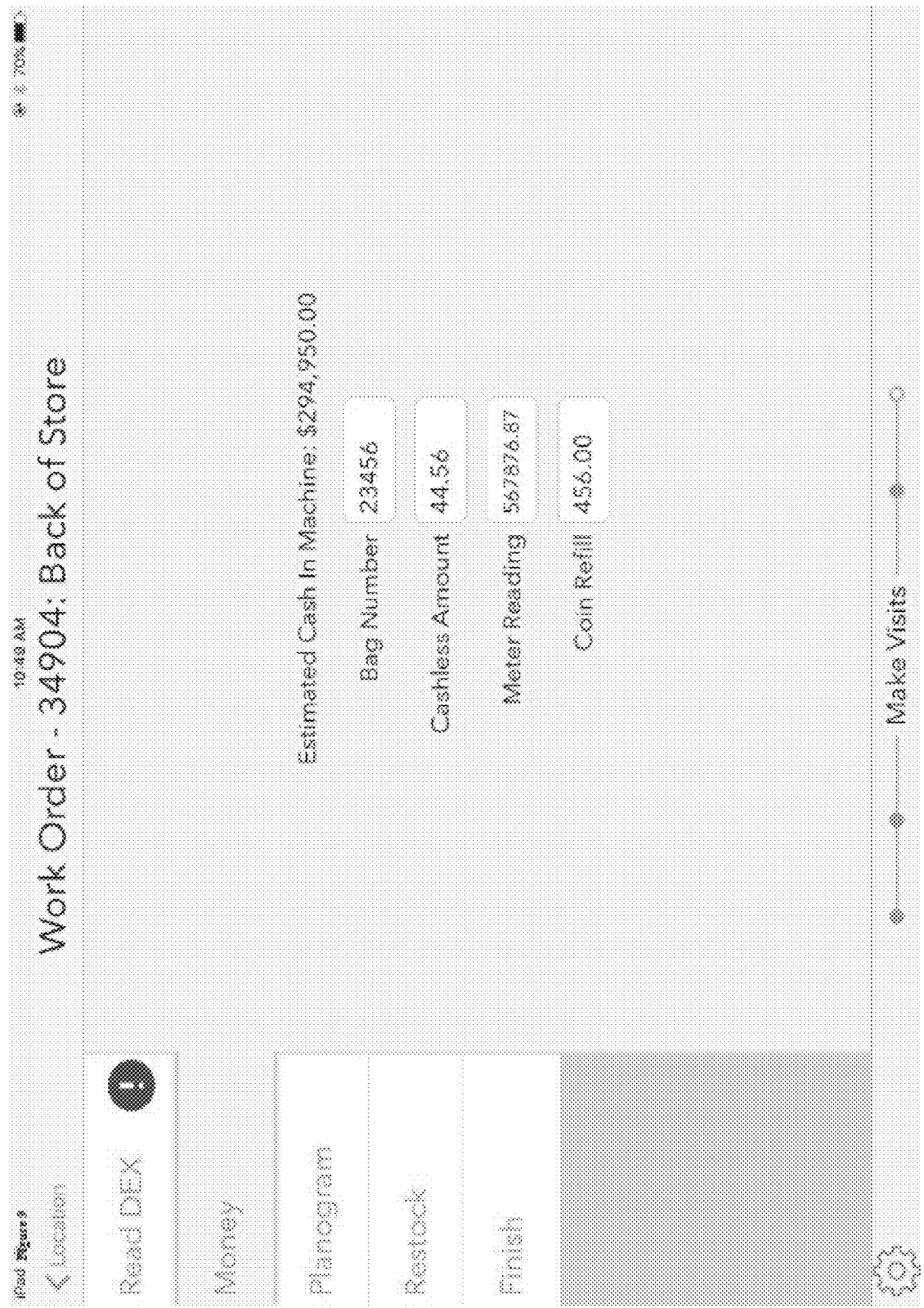
Figure 10:
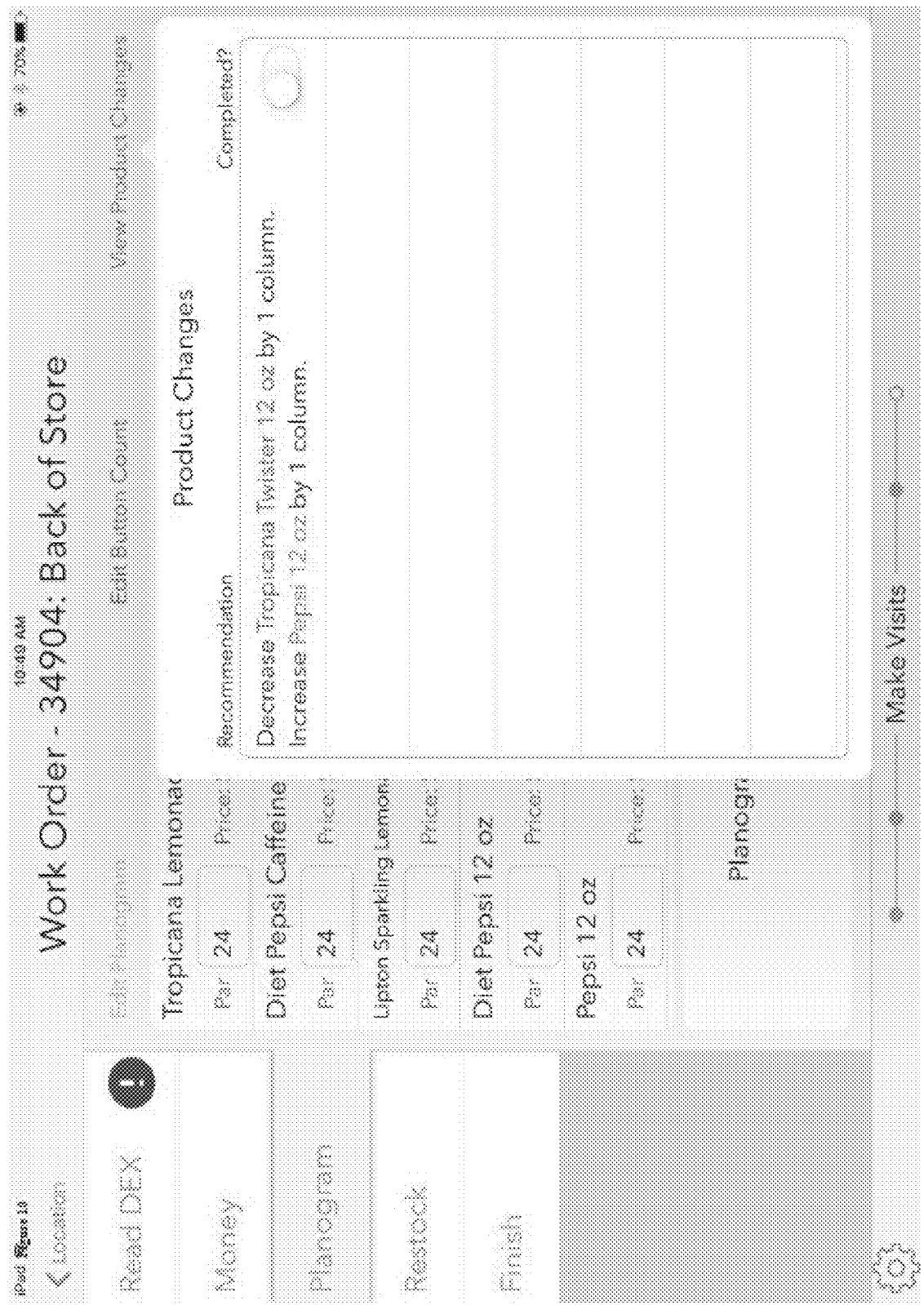
Figure 11:
Figure 12:
Figure 13:
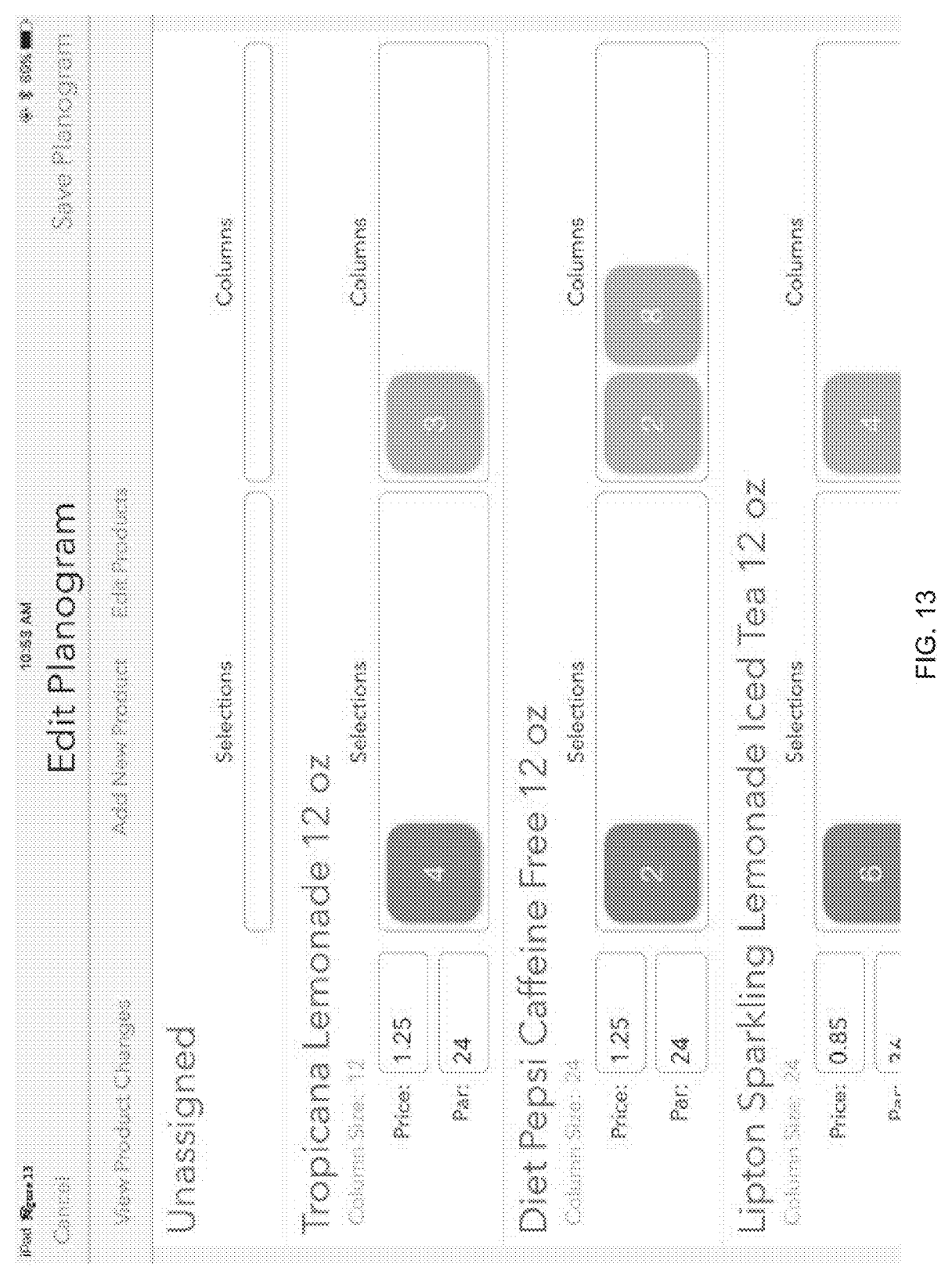
Figure 14:
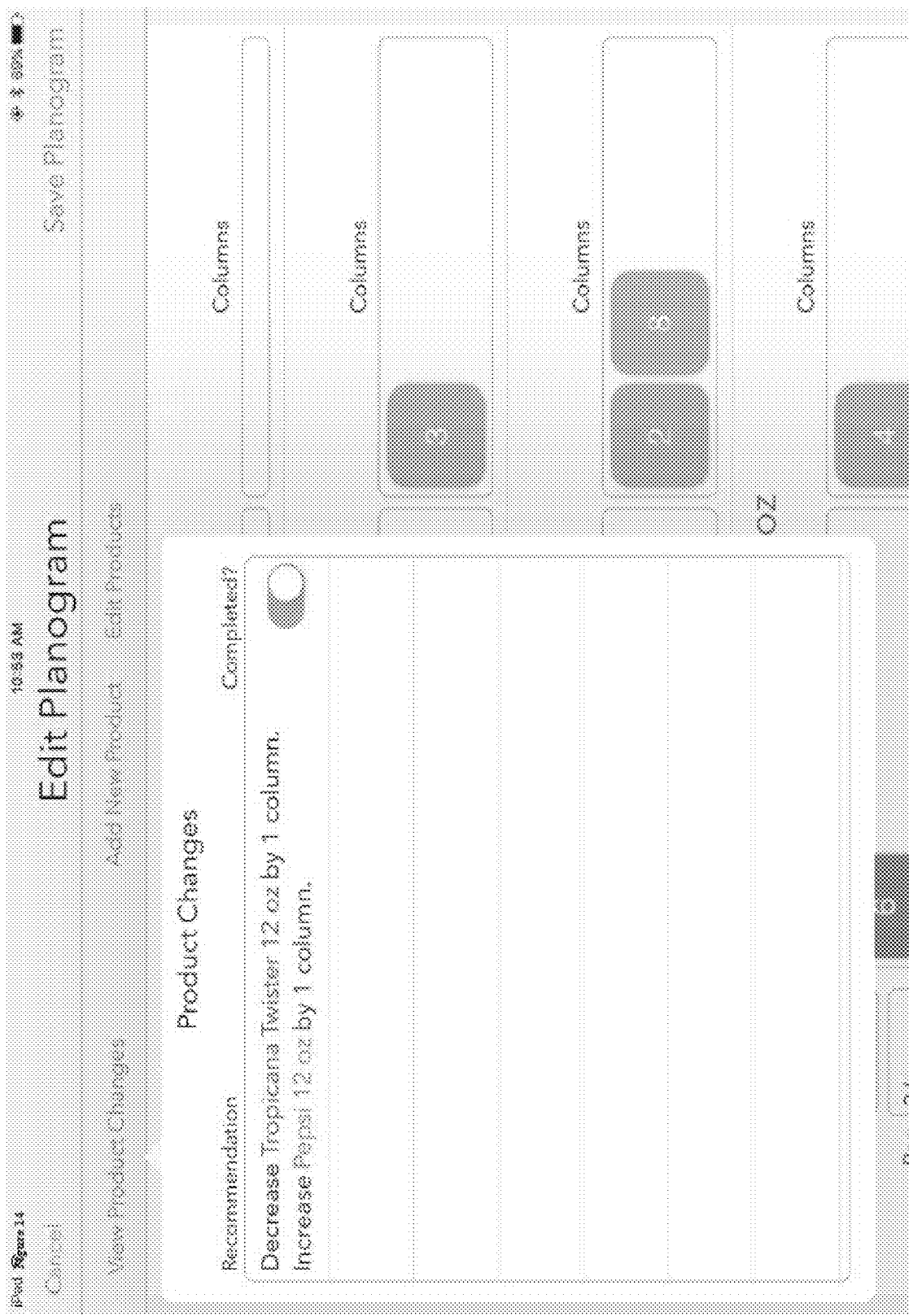
Figure 15:
Figure 17:
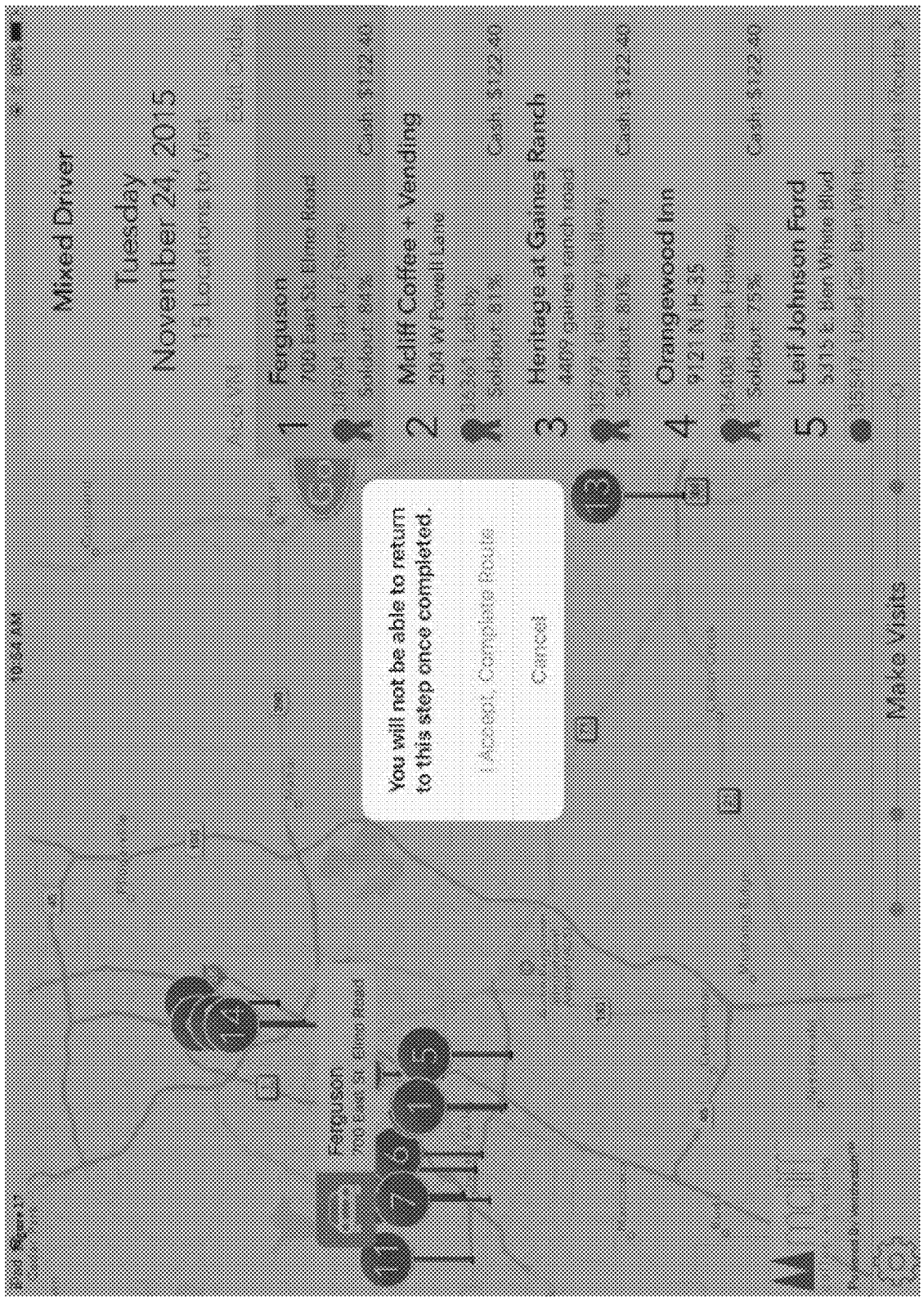

FIG. 8 shows the entire process for the driver, including "DEX", "money", PoG, "restock" and "finish." FIG. 8 is instructing the driver to download the DEX file from the machine. FIG. 9 shows the estimated money to be collected, the bag the money should go in, and the like. FIG. 10 shows the PoG is to be edited based on the accepted StS change (see FIG. 2). FIG. 11 shows the starting PoG, FIGS. 12-13 show how the PoG can be edited to change prices or "columns" assigned to a product, and FIG. 14 shows how the driver must indicate when the PoG change is complete. FIGS. 15-16 show how, after PoG editing, the actual restocking occurs.

Figure 18:
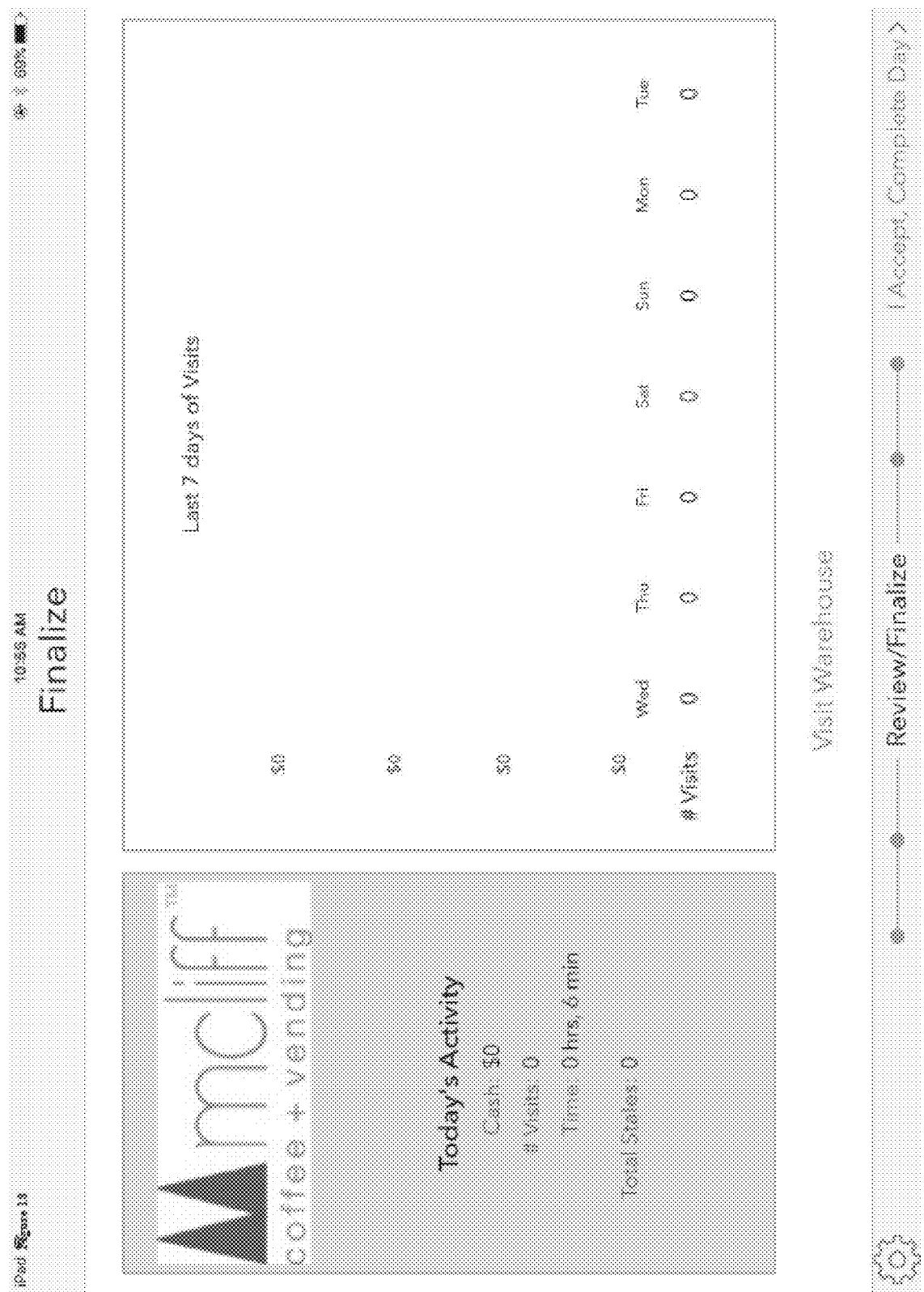

At the end of the day/route (block 205 and FIG. 18), all machines that have been selected for visit have been processed and the driver returns to the warehouse. At this point, the smartphone application 102 and the online application 100 have been constantly updated through the day and the central warehouse manager is presented with an accurate list of all residual inventory remaining on the truck in the form of unused new product or returned stale product. The driver interacts with the smartphone application as this remaining inventory is processed back into the central warehouse. This provides accurate and auditable accounting of assets in and out for that truck and driver.

Another required task at the end of the day is delivery of the sales receipts collected from the vending machines over the course of the day (block 206). As above, the smartphone application and the central application have been in periodic communication over the course of the day and an accurate expected collections total has been calculated. The route driver interacts with the operations back office personnel to deliver the funds and validate that the funds collected match the expected collections.

Figure 19:
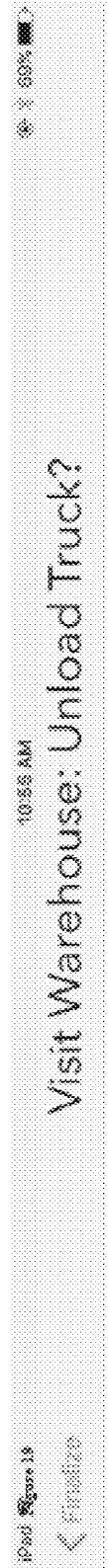
Figure 21:
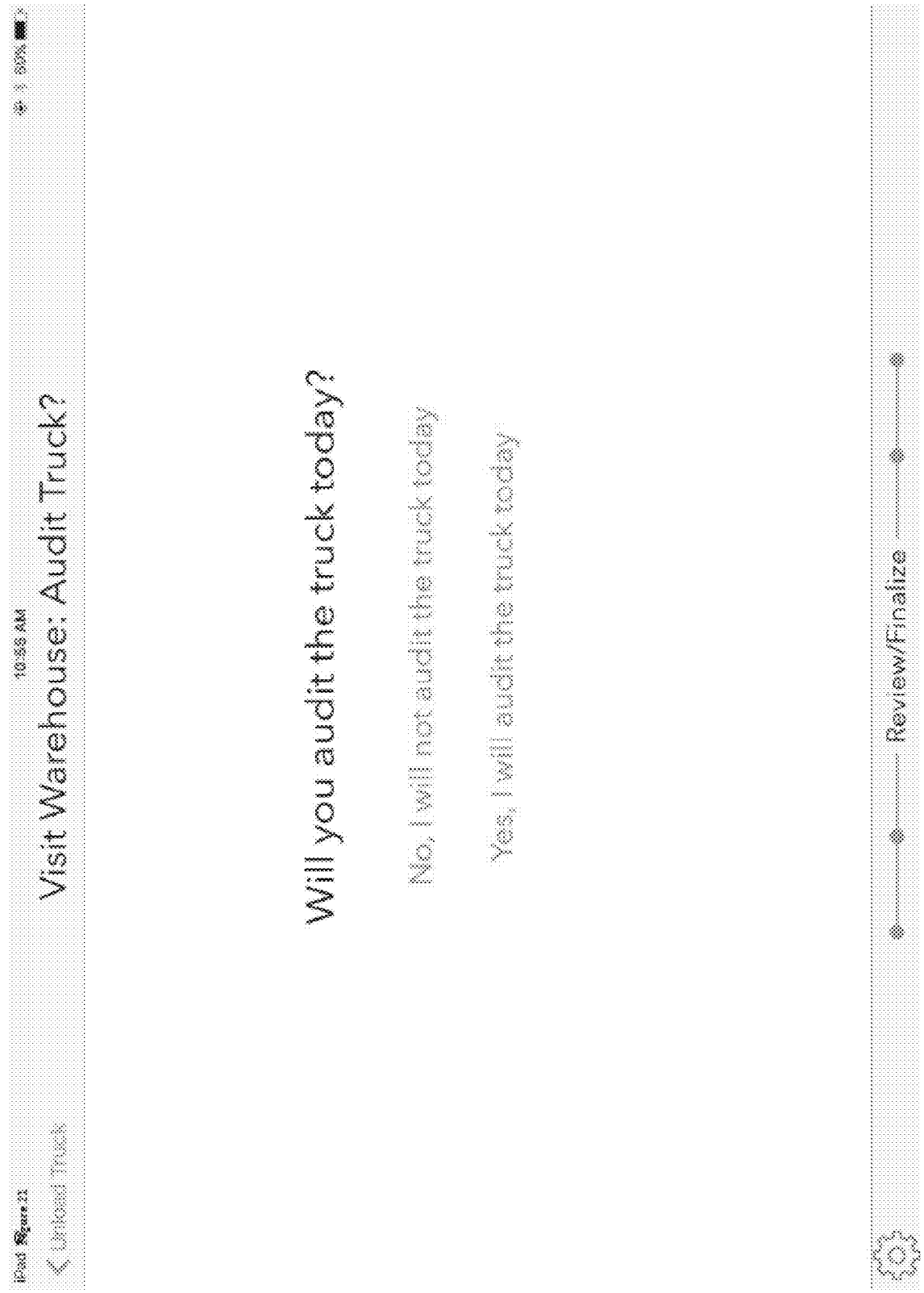
Figure 23:
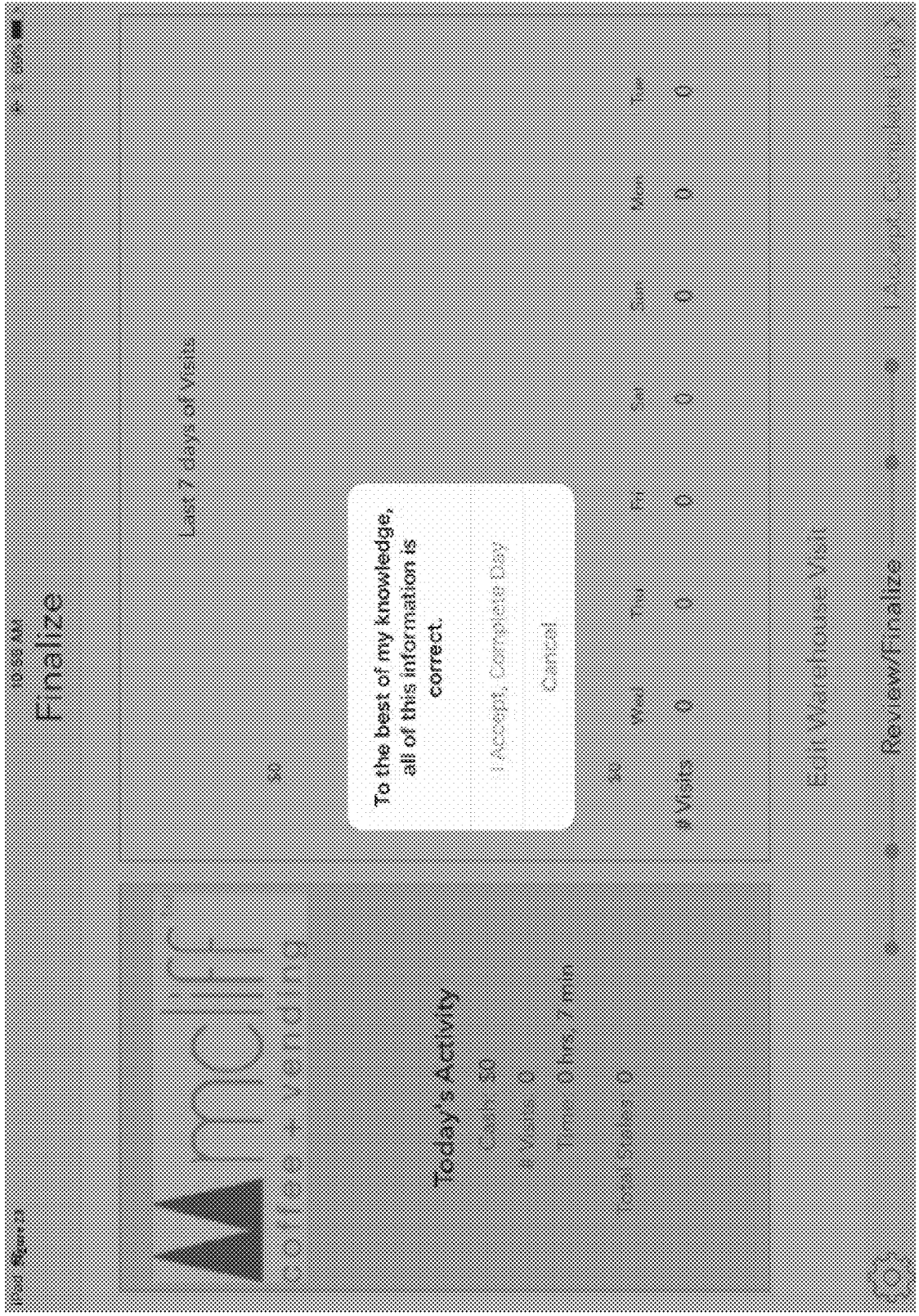

FIG. 19 prompts the driver regarding unloading the truck and FIG. 20 shows how the unloading the truck is monitored to prevent product theft. The "stales" indicate that if a product was removed from a machine for staleness that product should be returned to the warehouse. FIGS. 21-22 may allow for auditing of any inventory left on the truck. FIG. 23 continues the quest for honesty and accountability by asking the driver to confirm the entered information is correct.

The following series of steps (which pertain to FIG. 26) occur repeatedly through the day as the driver visits the location of one or more machines. Note that it is common for a vending operator to have several machines at a given physical location. The prediction logic of the central application lists only the machines at such a location that are profitable to visit that day. This removes a significant inefficiency that is common in conventional practices. Prior to embodiments described herein, drivers often visited a machine because it was nearby and not based upon its profitability factor. An embodiment removes that inefficiency by listing only the most profitable visits and by marshalling driver behavior to follow that list deterministically.

In addition, the smartphone application 102 interacts with the central server application 100 to provide driving directions, special instructions, passcode credentials, or other information that assists the driver in locating and arriving at the machine.

Once arriving at a machine to be visited the following occurs. Based upon historical telemetry as well as predictive logic, the central process application makes a prediction of what existing inventory remaining in the machine may be stale or otherwise past some expiration date (block 300). This list of products is presented to the driver as a work order to be completed and processed.

Based upon block 300, as well interaction with the central application, the smartphone application generates and displays a list of truck inventory that is required to stock the machine(s) to full restock capacity (block 301). This operation is made as efficient as possible by using predictive logic (e.g., FIG. 27) and the trips from truck to machine are minimized by this online logic.

Based on block 301, inventory is loaded onto a cart or other conveyance and the driver opens the machine and transfers inventory into the machine to a full-restock level (block 302). Note that the smartphone application 102 interacts directly with the telemetry device 101 through a wireless proximity-based communications protocol (e.g., Bluetooth® proximity). This enables the restock operation to be recorded online 100, validated, and tracked as the day progresses.

A regular task of a route driver is to collect the sales receipts in the form of actual cash or in the form of cashless records (block 303). The smartphone app interacts with the central application to make a prediction of expected values for each of these. The collections are then verified by the route driver and the results are forwarded to the central system in real-time. Through this mechanism, an embodiment provides auditable accounting and financial information as the day progresses. This promotes accountability and honesty of the field operators and is unique to this invention.

Once the previous tasks have been accomplished, any required maintenance tasks for the machine being visited are presented to the driver as a series of work order tickets (block 304). These may include simple tasks such as cleaning machine components. However, an embodiment provides for complete automation of complex tasks such as price change or product selection change. Since the embodiment provides a wireless connection between the smartphone application and the vending machine controller, the machine may be reconfigured and/or reprogrammed automatically.

Each step of processing these work orders (blocks 300-304) is validated and confirmed by the application 102 and/or 100 such that there is little to no subjectivity or human error. The embodiment allows for central automation of these complex configurations for the machines 104 allowing for more rapid deployment along with the reduction of dependency on highly trained technical personnel. In addition, block 304 allows for improved brand management by allowing for dynamic product placement and space to sales ratios (see, e.g., dynamic adjustment of PoG at FIG. 14) to be set from the central back office application logic 100 and policy. Thus, such an embodiment provides for flexibility and dynamism that does not currently exist.

As is evident from the description above, embodiments provide a new level of control and validation of vending field operations. Embodiments also enable new business and operations models for the vending operator as follows.

First, through the use of real-time validation and verification, a variable compensation plan is enabled where accuracy and adherence to policy is deterministically rewarded. For example, a driver properly employing the protocols of FIGS. 27, 28 may increase profits and his or her compensation.

Second, through the use of "gamification", a competitive environment can be created where the driver sees progress measured against a virtual team and strives to succeed. Third, an embodiment provides measured performance metrics for evaluation and development of field personnel. For example, in FIG. 18 the driver can see his recent performance. Some embodiments contrast this with overlaid information regarding top performing drivers, average rated drivers, and the like.

Fourth, through full integration with back-office systems, "just in time" inventory systems are enabled. Fifth, by marshaling the field operations into a "profits first" mode of operation, maximum revenues are possible against minimal expense. Sixth, an embodiment provides a new product marketing mechanism by making product placement and availability a dynamic feature.

Embodiments herein at times discuss smartphones, servers, and telemetry devices. These are all examples of computing nodes. Each such computing node may utilize a system such as the system of FIGS. 29, 30, discussed below. In fact, embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions.

Figure 29:
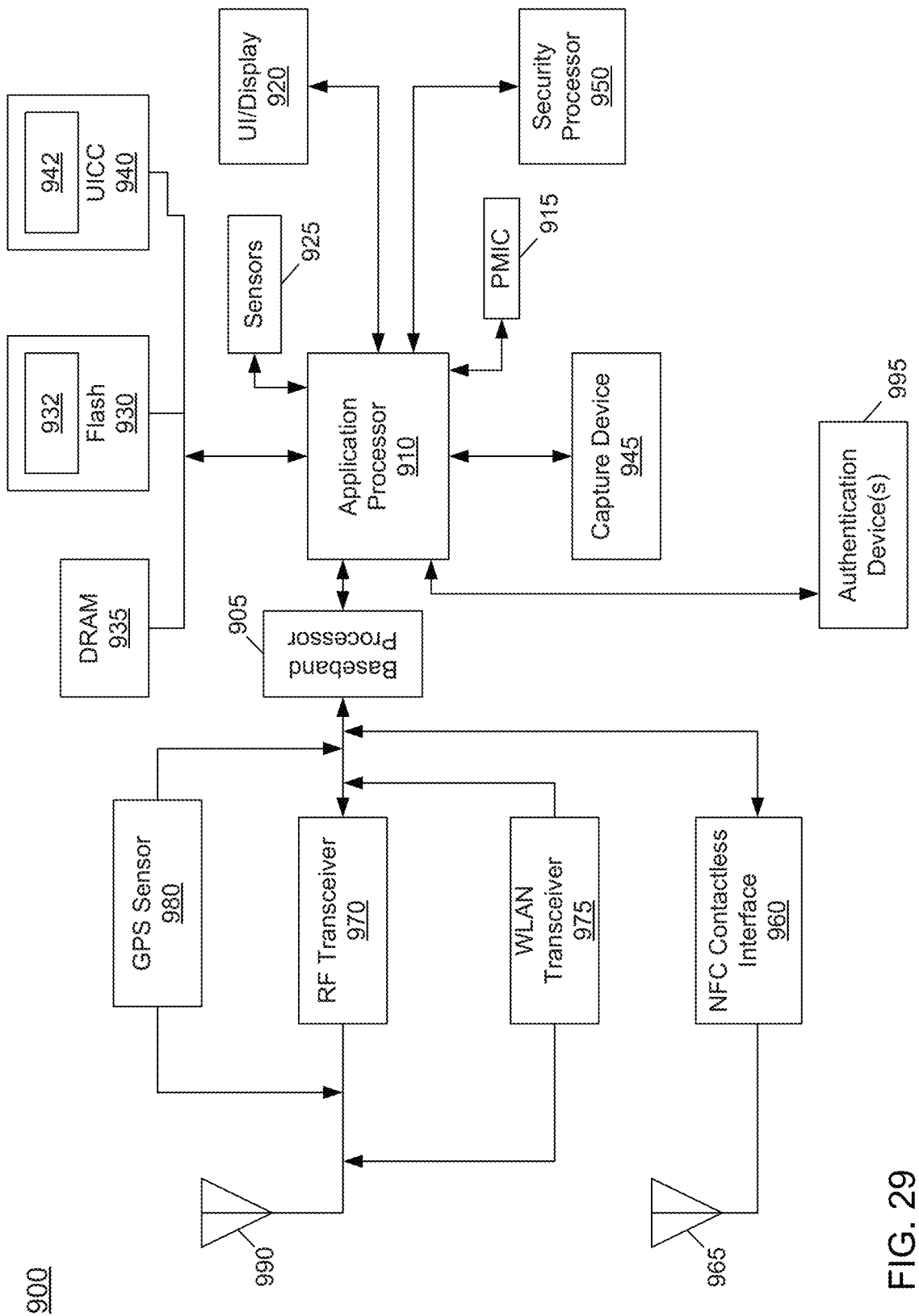
FIG. 29 includes a system for use in an embodiment.

Referring now to FIG. 29, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

A universal integrated circuit card (UICC) 940 comprises a subscriber identity module, which in some embodiments includes a secure storage 942 to store secure user information. System 900 may further include a security processor 950 that may couple to application processor 910. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown, understand that in some implementations one antenna or a different set of antennae may be provided to enable various wireless functionalities.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitries may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 30:
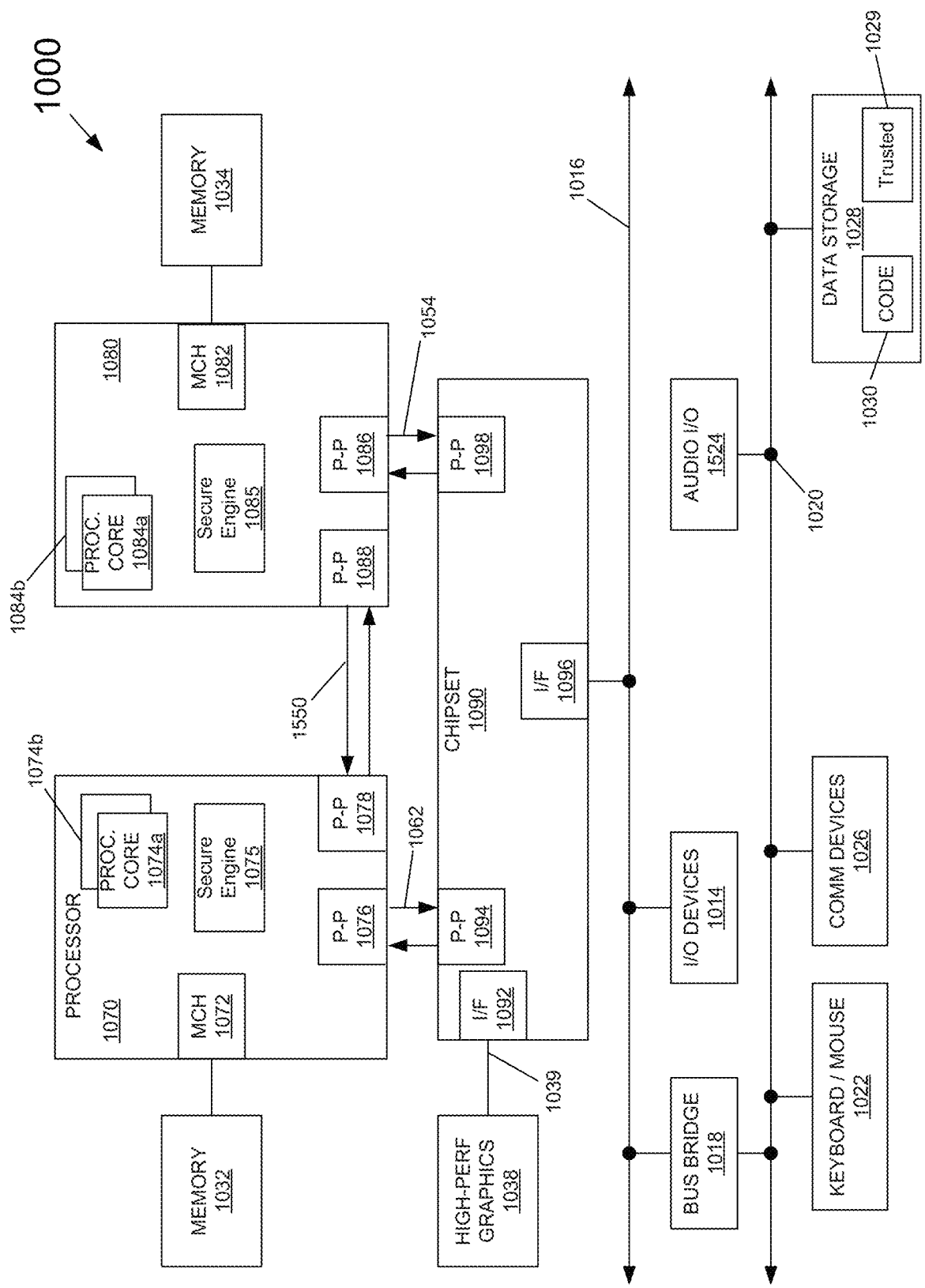
FIG. 30 includes a system for use in an embodiment.

Referring now to FIG. 30, shown is a block diagram of a system in accordance with another embodiment of the present invention. Multiprocessor system 1000 is a point-to-point interconnect system such as a server system, and includes a first processor 1070 and a second processor 1080 coupled via a point-to-point interconnect 1050. Each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations, IoT network onboarding or so forth.

First processor 1070 further includes a memory controller hub (MCH) 1072 and point-to-point (P-P) interfaces 1076 and 1078. Similarly, second processor 1080 includes a MCH 1082 and P-P interfaces 1086 and 1088. MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. Chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. Various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

As used herein a processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD)

and the like. In some implementations, a controller in machine 104 is intended to represent content (e.g., software instructions, etc.), which when executed implements the features described herein.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

Example 1 includes a method executed by at least one processor comprising: determining inventories for first and second times for a first vending machine (VM); determining inventories for first and second times for a second VM; determining inventories for first and second times for a third VM; and determining a service route to visit the first and second VMs on a specific date, and to specifically avoid visiting the third VM on the specific date, in response to determining the inventories for the second times for the first, second, and third VMs.

For example, "determining" may include initially arriving at the determined result or may merely mean receiving a communication that has the determined result. For example, a mobile node receiving a communication with an updated inventory is nevertheless determining that updated inventory. Avoiding a branch in a decision tree may constitute specifically avoiding an action.

In example 2 the subject matter of the Example 1 can optionally include determining cash balances for the first, second, and third VMs; and determining the service route in response to determining the cash balances for the first, second, and third VMs.

Many of examples 1-17 may be performed on node 100, node 102, or in a distributed fashion with different elements of a method executed on different ones of nodes 100, 102.

In example 3 the subject matter of Examples 1-2 can optionally include determining first space-to-sales (StS) for the first VM; determining first rate of consumption (RoC) for the first VM; and adjusting the first StS for the first VM to determine an adjusted first StS for the first VM in response to: (a) determining the first RoC, and (b) determining the inventory for the first time for the first VM.

In example 4 the subject matter of the Examples 1-3 can optionally include visually displaying the adjusted StS; and visually prompting a user regarding whether the user accepts the adjusted StS.

In example 5 the subject matter of the Examples 1-4 can optionally include determining the user accepts the adjusted StS; visually prompting the user to adjust a plan-o-gram (PoG) for the first VM in response to determining the user accepts the adjusted StS; and specifically avoiding prompting the user to adjust the PoG for the first VM in response to determining the user does not accept the adjusted StS.

In example 6 the subject matter of the Examples 1-5 can optionally include visually displaying the service route; and visually prompting a user regarding whether the user accepts the service route; determining a single quantity of a product required to restock both the first and second VMs in response to determining the inventories for the second times for the first and second VMs and further in response to determining the user accepts the service route; and visually displaying the quantity of product required to restock the first and second VMs.

In example 7 the subject matter of the Examples 1-6 can optionally include determining quantities of products removed from an inventory of the user and replaced into an inventory of the vendor; and determining the quantity of product required to restock the first and second VMs in response to determining quantities of products removed from the inventory of the user and replaced into the inventory of the vendor.

In example 8 the subject matter of the Examples 1-7 can optionally include determining the first VM will exhaust total inventory for a product at a first exhaustion time that follows the first time for the first VM; determining the second VM will exhaust total inventory for a product at a second exhaustion time that follows the first time for the second VM; and determining the first exhaustion time precedes the second exhaustion time; wherein determining the service route includes determining to visit the first VM before the second VM in response to determining the first exhaustion time precedes the second exhaustion time.

In example 9 the subject matter of the Examples 1-8 can optionally include determining inventories for first and second times for a fourth VM; and determining the service route to visit the fourth VM between visiting the first and second VMs; and determining locations for the first, second, and fourth VMs; wherein the location of the first VM is closer to the location of the second VM than the location of the fourth VM.

In example 10 the subject matter of Examples 1-9 can optionally include wherein the first VM is located in a building and the third VM is located in the building.

In example 11 the subject matter of the Examples 1-10 can optionally include wherein the first VM is located in a building and the third VM is located in another building within 1 mile of the building.

In example 12 the subject matter of the Examples 1-11 can optionally include wherein the first time is for a time occurring before execution of the service route commences and the second time is for a time projected to occur during the execution of the service route.

In example 13 the subject matter of the Examples 1-12 can optionally include in a first step visually prompting a user to access a digital vending record for the first VM; in a second step visually prompting the user to withdraw financial proceeds from the first VM; in a third step visually prompting the user to adjust a plan-o-gram (PoG) for the first VM; and in a fourth step visually prompting the user to restock the first VM; wherein the first, second, third, and fourth steps are to be performed in a first sequence that is to be repeated when the second VM is visited.

In example 14 the subject matter of the Examples 1-13 can optionally include_determining the inventories for the first and second times for the first VM before execution of the service route commences; adjusting the inventory for the second time for the first VM after the service route commences but before the first VM is restocked; determining a quantity of a product required to restock the first VM in response to adjusting the inventory; and visually displaying the quantity of product required to restock the first VM before the first VM is restocked.

In example 15 the subject matter of the Examples 1-14 can optionally include_determining first space-to-sales (StS) for the first VM; determining first rate of consumption (RoC) for the first VM; determining maximum production potential for the first VM; and adjusting the first StS for the first VM to determine an adjusted first StS for the first VM in response to determining: (a) the first RoC, (b) the inventory for the first time for the first VM, and (c) the maximum production potential.

Example 16 includes at least one machine readable medium comprising a plurality of instructions that in response to being executed on the at least one processor, cause the at least one processor to carry out a method according to any one of examples 1 to 15.

For example, example 1 may include at least one storage medium having instructions stored thereon for causing a system to determine inventories for first and second times for a first vending machine (VM); determine inventories for first and second times for a second VM; determine inventories for first and second times for a third VM; and determine a service route to visit the first and second VMs on a specific date, and to specifically avoid visiting the third VM on the specific date, in response to determining the inventories for the second times for the first, second, and third VMs.

Example 17 includes a communications device arranged to carry out a method according to any one of examples 1 to 15.

For example, example 1 may include an apparatus comprising: at least one memory and at least one processor, coupled to the at least one memory, to perform operations comprising: determining inventories for first and second times for a first vending machine (VM); determining inventories for first and second times for a second VM; determining inventories for first and second times for a third VM; and determining a service route to visit the first and second VMs on a specific date, and to specifically avoid visiting the third VM on the specific date, in response to determining the inventories for the second times for the first, second, and third VMs.

For example, the predictive sales modeling module (which may be hardware, software, or firmware) may perform the determining tasks in example 1. Also, the StS recommendation module may perform the adjusting and determining processes in example 3.

Example 18 includes a distributed computing system comprising: a first computing node including at least one first processor and at least one machine readable medium comprising a plurality of instructions that in response to being executed on the at least one first processor, cause the first node to carry out a first method comprising: determining inventories for first and second times for a first vending machine (VM); determining inventories for first and second times for a second VM; determining inventories for first and second times for a third VM; and determining a service route to visit the first and second VMs on a specific date, and to specifically avoid visiting the third VM on the specific date, in response to determining the inventories for the second times for the first, second, and third VMs; determining first space-to-sales (StS) for the first VM; determining first rate of consumption (RoC) for the first VM; and adjusting the first StS for the first VM to determine an adjusted first StS for the first VM in response to: (a) determining the first RoC, and (b) determining the inventory for the first time for the first VM; and a second computing node including at least one second processor and at least one machine readable medium comprising a plurality of instructions that in response to being executed on the at least one second processor, cause the second node to carry out a second method comprising: visually displaying the adjusted StS; and visually prompting a user regarding whether the user accepts the adjusted StS.

In example 19 the subject matter of the Example 18 can optionally include the second method comprising: determining the user accepts the adjusted StS; visually prompting the user to adjust a plan-o-gram (PoG) for the first VM in response to determining the user accepts the adjusted StS.

In example 20 the subject matter of the Examples 16-19 can optionally include the first method comprising: determining the inventories for the first and second times for the first VM before execution of the service route commences; adjusting the inventory for the second time for the first VM after the service route commences but before the first VM is restocked; and determining a quantity of a product required to restock the first VM in response to adjusting the inventory; the second method comprising visually displaying the quantity of product required to restock the first VM before the first VM is restocked.

The foregoing description of the embodiments of the invention has been presented for the purposes of illustration and description. It is not intended to be exhaustive or to limit the invention to the precise forms disclosed. Persons skilled in the art will recognize various equivalent combinations and substitutions for various components shown in the Figures. It is therefore intended that the scope of the invention be limited not by this detailed description, but rather by the claims appended hereto.

What is claimed is:

1. A method executed by a processor-based system comprising:
   in response to communications between the system and (a)(i) at least one telemetry module coupled to at least one of first, second, and third vending machines (VMs), and (a)(ii) at least one remote computing user node, the system: (b)(i) calculating inventories for first and second times for each of first, second, and third vending machines (VM) before execution of a service route commences;
   in response to calculating the inventories for the second times for the first, second, and third VMs, the system: (c)(i) generating the service route to visit the first and second VMs on a specific date, and specifically avoiding visiting the third VM on the specific date, and (c)(ii) storing the service route in a non-transitory, physical, machine-readable medium;
   in response to at least one additional communication between the system and the at least one telemetry module, the system adjusting the inventory for the second time for the first VM after the service route commences but before the first VM is restocked; and
   in response to adjusting the inventory, the system calculating a quantity of a product required to restock the first VM.

2. The method of claim 1 comprising:
   in response to the communications, the system calculating cash balances for the first, second, and third VMs; and
   in response to calculating the cash balances for the first, second, and third VMs, generating the service route.

3. The method of claim 1 comprising:
   in response to the communications, the system calculating quantities of products removed from an inventory of a user and replaced into an inventory of a vendor; and
   in response to calculating quantities of products removed from the inventory of the user and replaced into the inventory of the vendor, the system calculating a single quantity of product required to restock both the first and second VMs;

wherein the communications include a user using the at least one remote computing user node to log into the system.

4. The method of claim 1 comprising the system:
calculating that the first VM will exhaust total inventory for a product at a first exhaustion time that follows the first time for the first VM;
calculating that the second VM will exhaust total inventory for a product at a second exhaustion time that follows the first time for the second VM; and
calculating that the first exhaustion time precedes the second exhaustion time;
wherein generating the service route includes determining to visit the first VM before the second VM in response to calculating the first exhaustion time precedes the second exhaustion time.

5. The method of claim 1 comprising:
in response to another communication between the system and at least one of the at least one telemetry module and an additional at least one telemetry module coupled to a fourth VM, the system calculating inventories for first and second times for the fourth VM;
the system generating the service route to visit the fourth VM between visiting the first and second VMs; and
the system calculating locations for the first, second, and fourth VMs;
wherein the location of the first VM is closer to the location of the second VM than the location of the fourth VM.

6. The method of claim 1, wherein the first time is for a time occurring before execution of the service route commences and the second time is for a time projected to occur during the execution of the service route.

7. A system comprising:
at least one non-transitory, physical, machine-readable medium;
at least one processor coupled to the non-transitory, physical, machine-readable medium;
wherein:
in response to communications between the at least one processor and (a)(i) at least one telemetry module coupled to at least one of first, second, and third vending machines (VMs), and (a)(ii) at least one remote computing user node, the at least one processor is to: (b)(i) calculate inventories for first and second times for each of first, second, and third vending machines (VM) before execution of a service route commences;
in response to calculating the inventories for the second times for the first, second, and third VMs, the at least one processor is to: (c)(i) generate the service route to visit the first and second VMs on a specific date, and specifically avoid visiting the third VM on the specific date, and (c)(ii) store the service route in the non-transitory, physical, machine-readable medium;
in response to at least one additional communication between the at least one processor and the at least one telemetry module, the at least one processor is to adjust the inventory for the second time for the first VM after the service route commences but before the first VM is restocked; and
in response to adjusting the inventory, the at least one processor is to calculate a quantity of a product required to restock the first VM.

8. The system of claim 7 wherein:
in response to the communications, the at least one processor is to calculate cash balances for the first, second, and third VMs; and
in response to calculating the cash balances for the first, second, and third VMs, the at least one processor is to generate the service route.

9. The system of claim 7 comprising:
in response to the communications, the at least one processor is to calculate quantities of products removed from an inventory of a user and replaced into an inventory of a vendor; and
in response to calculating quantities of products removed from the inventory of the user and replaced into the inventory of the vendor, the at least one processor is to calculate a single quantity of product required to restock both the first and second VMs;
wherein the communications include a user using the at least one remote computing user node to log into the system.

10. The system of claim 7, wherein the at least one processor is to:
calculate that the first VM will exhaust total inventory for a product at a first exhaustion time that follows the first time for the first VM;
calculate that the second VM will exhaust total inventory for a product at a second exhaustion time that follows the first time for the second VM; and
calculate that the first exhaustion time precedes the second exhaustion time;
wherein generating the service route includes determining to visit the first VM before the second VM in response to calculating the first exhaustion time precedes the second exhaustion time.

11. The system of claim 7 wherein:
in response to another communication between the at least one processor and at least one of the at least one telemetry module and an additional at least one telemetry module coupled to a fourth VM, the at least one processor is to calculate inventories for first and second times for the fourth VM;
the at least one processor is to generate the service route to visit the fourth VM between visiting the first and second VMs; and
the at least one processor is to calculate locations for the first, second, and fourth VMs;
wherein the location of the first VM is closer to the location of the second VM than the location of the fourth VM.

12. The system of claim 7 wherein the first time is for a time to occur before execution of the service route commences and the second time is for a time projected to occur during the execution of the service route.

* * * * *